US012526755B2

(12) United States Patent
Fischer

(10) Patent No.: US 12,526,755 B2
(45) Date of Patent: Jan. 13, 2026

(54) MULTI-LINK OPERATION WITH TRIGGERED ALIGNMENT OF FRAMES

(71) Applicant: Avago Technologies International Sales Pte. Limited, Singapore (SG)

(72) Inventor: Matthew James Fischer, Mountain View, CA (US)

(73) Assignee: Avago Technologies International Sales Pte. Limited, Singapore (SG)

( * ) Notice: Subject to any disclaimer, the term of this patent is extended or adjusted under 35 U.S.C. 154(b) by 0 days.

(21) Appl. No.: 18/465,310

(22) Filed: Sep. 12, 2023

(65) Prior Publication Data

US 2023/0422188 A1    Dec. 28, 2023

Related U.S. Application Data

(63) Continuation of application No. 17/114,344, filed on Dec. 7, 2020, now Pat. No. 11,785,562.

(60) Provisional application No. 62/952,127, filed on Dec. 20, 2019.

(51) Int. Cl.
*H04W 76/15*    (2018.01)
*H04W 56/00*    (2009.01)
*H04W 74/0816*    (2024.01)
*H04W 84/12*    (2009.01)

(52) U.S. Cl.
CPC .......... *H04W 56/0005* (2013.01); *H04W 74/0816* (2013.01); *H04W 76/15* (2018.02); *H04W 84/12* (2013.01)

(58) Field of Classification Search
CPC ...... H04L 11/08; H04L 1/1607; H04W 56/00; H04W 76/15; H04W 84/12; H04W 74/0816
See application file for complete search history.

(56) References Cited

U.S. PATENT DOCUMENTS

| | | | | |
|---|---|---|---|---|
| 9,020,008 | B2 * | 4/2015 | Hui | H04W 72/30 370/428 |
| 9,225,589 | B2 * | 12/2015 | Hui | H04W 40/12 |
| 11,576,208 | B2 * | 2/2023 | Seok | H04L 1/1607 |
| 2001/0046225 | A1 * | 11/2001 | Schwaller | H04W 88/08 370/478 |

(Continued)

FOREIGN PATENT DOCUMENTS

CN    102832979 A    12/2012
CN    108353424 A    7/2018

OTHER PUBLICATIONS

Notice of Allowance on U.S. Appl. No. 17/114,344 Dtd Jun. 14, 2023.

(Continued)

*Primary Examiner* — Hassan A Phillips
*Assistant Examiner* — Prenell P Jones
(74) *Attorney, Agent, or Firm* — Foley & Lardner LLP

(57) ABSTRACT

A multi-link device may be configured to initiate transmission of a first data unit on a first wireless link of a first multi-link device, and request transmission of a trigger from a second multi-link device on a second wireless link. In response to receiving the trigger, the multi-link device may align a last symbol end time of a response transmission on the second wireless link with a last symbol end time of the first data unit being transmitted on the first multi-link device.

20 Claims, 31 Drawing Sheets

(56) References Cited

U.S. PATENT DOCUMENTS

| | | | |
|---|---|---|---|
| 2004/0037558 A1* | 2/2004 | Beshai | H04J 14/08 |
| | | | 398/47 |
| 2007/0109973 A1 | 5/2007 | Trachewsky | |
| 2010/0226342 A1* | 9/2010 | Colling | H04W 56/002 |
| | | | 370/336 |
| 2015/0055587 A1* | 2/2015 | Sampath | H04W 72/53 |
| | | | 370/329 |
| 2017/0048862 A1 | 2/2017 | Choi et al. | |
| 2017/0280452 A1 | 9/2017 | Choi et al. | |
| 2018/0014327 A1 | 1/2018 | Park | |
| 2018/0049242 A1* | 2/2018 | Viger | H04W 72/0453 |
| 2019/0082373 A1 | 3/2019 | Patil et al. | |
| 2020/0067577 A1* | 2/2020 | Lou | H04B 7/0417 |
| 2020/0076552 A1* | 3/2020 | Cherian | H04B 7/024 |
| 2020/0274612 A1* | 8/2020 | Shah | H04B 7/265 |
| 2020/0274656 A1* | 8/2020 | Gordaychik | H04L 1/1887 |
| 2020/0336258 A1* | 10/2020 | Zhu | H04L 43/0835 |
| 2021/0014811 A1* | 1/2021 | Seok | H04W 76/15 |
| 2021/0028831 A1* | 1/2021 | Lou | H04B 7/0452 |
| 2021/0160347 A1 | 5/2021 | Chu | H04L 69/14 |
| 2022/0346176 A1* | 10/2022 | Jang | H04W 84/12 |
| 2023/0292402 A1* | 9/2023 | Park | H04W 74/0816 |

OTHER PUBLICATIONS

Foreign Action other than Search Report on non-Foley case related to US Dtd Oct. 28, 2024.
Yunbo Li, "Channel Access Design for Synchronized Multi-Links," IEEE 802.11-19/1548r1.

* cited by examiner

MULTI-LINK OPERATION WITH TRIGGERED ALIGNMENT OF FRAMES

CROSS-REFERENCES TO RELATED APPLICATIONS

This application is a Continuation of U.S. application Ser. No. 17/114,344 entitled "MULT-LINK OPERATION WITH TRIGGERED ALIGNMENT OF FRAMES", filed Dec. 7, 2020, which claims priority to and the benefit of U.S. Provisional Patent Application No. 62/952,127, filed Dec. 20, 2020, which is hereby incorporated by reference in its entirety for all purposes.

TECHNICAL FIELD

The present description relates in general to wireless communication systems, and in particular wireless local area network communications.

BACKGROUND

Wireless local area network (WLAN) devices communicate with one another over wireless links. WLAN devices may be built with multiple radios and media access control functions (MACs) to operate over multiple wireless links. Some devices may have internally generated interference coupling between wireless links which occurs during transmission. Simultaneous transmit and receive operation over such multiple wireless links may result in drops in system throughput and overall performance.

SUMMARY

In aspects of the disclosure, a method is provided, the method including initiating transmission of a first data unit on a first wireless link of a first multi-link device; requesting, with a trigger request frame, on the first wireless link, transmission of a trigger from a second multi-link device on either, neither or both of the first wireless link and a second wireless link; and in response to receiving triggers on both links, aligning a last symbol end time of a response transmission on the second wireless link with a last symbol end time of a response transmission on the first wireless link.

In aspects of the disclosure, a method is provided, the method including receiving a first data unit on a first wireless link of a first multi-link device; receiving a second data unit on a second wireless link of the first multi-link device; determining an end time of the first data unit and an end time of the second data unit; and if the end time of the first data unit matches the end time of the second data unit, aligning end times of a first response data unit on the first wireless link and a second response data unit on the second wireless link.

In aspects of the disclosure, a method is provided, the method including indicating by an associated access point multi-link device, that synchronous alignment is requested within a base service set.

In aspects of the disclosure, a method is provided, the method including indicating, by a first multi-link device, within a frame transmitted on a first wireless link to a second multi-link device, medium state information for a second wireless link.

In aspects of the disclosure, a method is provided, the method including determining reception of a first data unit on a first wireless link of a first multi-link device; and transmitting, by the first multi-link device on a second wireless link, a trigger to a second multi-link device that causes a response frame to be transmitted with its end time aligned with the end time of the reception on the first wireless link.

In aspects of the disclosure, a method is provided, the method including determining a future time by a first device at which frame exchange will not be possible; and transmitting, in response to the reception of a request to send or MU request to send or request for trigger transmitted by a second device, a response frame that indicates the future time at which frame exchange will not be possible.

In aspects of the disclosure, a method is provided, the method including receiving, at a first multi-link device, on a first wireless link, one or more frames which provide future channel occupancy information for that link; initiating a first transmission by the first multi-link device, on a second wireless link, during the period of future channel occupancy for the first wireless link; and initiating a second transmission by the first multi-link device on the first wireless link, a short amount of time following the expiration of the future channel occupancy indication on the first wireless link provided that the first transmission is still ongoing at that time.

In aspects of the disclosure, a method is provided, the method including responding to a received request to send transmitted by a first multi-link device with a clear to send containing a duration field value that indicates a time value that will result in alignment of physical layer protocol data units transmitted subsequent to the clear to send with physical layer protocol data units being received on another link.

BRIEF DESCRIPTION OF THE DRAWINGS

Certain features of the subject technology are set forth in the appended claims. However, for purposes of explanation, several embodiments of the subject technology are set forth in the following figures.

DETAILED DESCRIPTION

Figure 1:
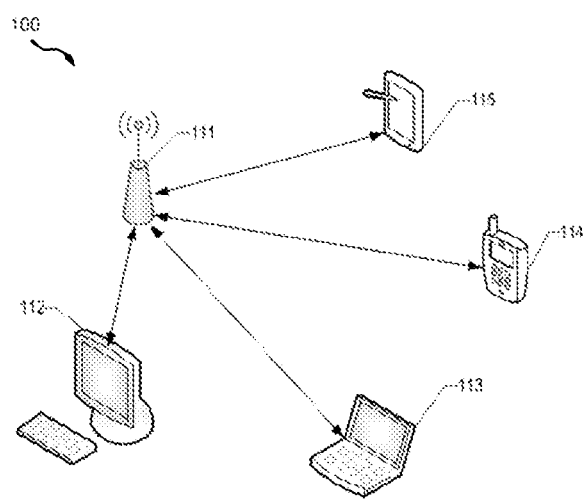
FIG. 1 illustrates an example wireless communication environment in which aspects of the subject technology may be implemented.

The detailed description set forth below is intended as a description of various configurations of the subject technology and is not intended to represent the only configurations in which the subject technology may be practiced. The appended drawings are incorporated herein and constitute part of the detailed description, which includes specific details for providing a thorough understanding of the subject technology. However, the subject technology is not limited to the specific details set forth herein and may be practiced without one or more of the specific details. In some instances, structures and components are shown in a block-diagram form in order to avoid obscuring the concepts of the subject technology.

WLAN devices may be built with multiple radios and MACs to operate over multiple wireless links simultaneously. However, when there is a transmission occurring on one link the near-end cross talk can cause deafness on the other link, which may cause the reliability of the determination of the medium state on that link to be significantly reduced. If the medium state is incorrectly determined or not determinable resulting in a loss of the correct medium state, such that the transmitter may be out of MAC medium state synchronization with other competing WLAN devices on that link all of which use the medium state of a link to determine when it is allowable to access the medium. When MAC medium state synchronization fails, the medium access mechanism fails and system throughput and performance may drop.

The subject technology proposes solutions for ensuring that medium state is not lost on the deaf link by forcing alignment of transmissions on the different links. Deafness on a link is temporary and may be related directly to the transmissions on another link. According to aspects of the subject technology, when the deafness disappears, medium state condition can be ascertained correctly in a relatively short period of time, thereby maintaining overall system MAC synchronization and system throughput.

According to aspects of the subject technology, a first multi-link device may be configured to initiate transmission of a first data unit on a first wireless link of the first multi-link device and request transmission of a trigger from a second multi-link device on one or more of the first and second wireless links. In response to receiving the trigger, the multi-link device may align a last symbol end time of a response transmission on the second wireless link with a last symbol end time of the first data unit being transmitted on the first multi-link device.

According to aspects of the subject technology, a first multi-link device may be configured to receive a first data unit on a first wireless link of the first multi-link device and receive a second data unit on a second wireless link of the first multi-link device. The first multi-link device may determine an end time of the first data unit and an end time of the second data unit. If the end time of the first data unit matches the end time of the second data unit, the first multi-link device may align end times of a first response data unit on the first wireless link and a second response data unit on the second wireless link.

According to aspects of the subject technology, a first multi-link device may be configured to initiate transmission of a first data unit on a first wireless link of the first multi-link device and determine that transmission of a second data unit on a second wireless link of the first multi-link device is ongoing. The first multi-link device may be configured to align an end of the last symbol of the first data unit transmitted on the first wireless link with an end of the last symbol of the second data unit transmitted on the second wireless link.

According to aspects of the subject technology, a first multi-link device may be configured to initiate transmission of a first data unit on a first wireless link of the first multi-link device and determine transmission of a second data unit on a second wireless link of the first multi-link device is ongoing. The first multi-link device may be configured to trigger a response data unit to the first data unit on the first wireless link to align with a response to the second data unit on the second wireless link.

FIG. 1 illustrates an example wireless communication environment in which aspects of the subject technology described herein and in the attached appendices may be implemented. In the wireless communication network 100, such as a wireless WLAN, a basic service set (BSS) includes a plurality of wireless communication devices (e.g., WLAN devices). In one aspect, a BSS refers to a set of stations (STAs) that can communicate in synchronization, rather than a concept indicating a particular area. In this example, the wireless communication network 100 includes wireless communication devices 111-115, which may be referred to as STAs. Each of the wireless communication devices 111-115 includes a radio-frequency (RF) transmitter and an RF receiver. The RF transmitter converts the symbols into an RF signal and transmits the RF signal via an antenna. The RF receiver receives an RF signal via the antenna and converts the RF signal into one or more symbols for processing.

Each of the wireless communication devices 111-115 may include a MAC layer and a physical (PHY) layer according to an Institute of Electrical and Electronics Engineers (IEEE) 802.11 standard or other wireless communication standards including the draft amendment IEEE 802.11ax. In this example, at least one wireless communication device (e.g., device 111) is an access point (AP). An AP may be referred to as an AP STA or an AP device. The other wireless communication devices (e.g., devices 112-115) may be non-AP STAs. Alternatively, all of the wireless communication devices 111-115 may be non-AP STAs in an ad hoc networking environment.

AP STAs and non-AP STAs may be collectively called STAs. However, for simplicity of description, in some aspect only a non-AP STA may be referred to as an STA. An AP may be, for example, a centralized controller, a base station (BS), a node-B, a base transceiver system (BTS), a site controller, a network adapter, a network interface card (NIC), a router, or the like. A non-AP STA (e.g., a client device operable by a user) may be, for example, a device with wireless communication capability, a terminal, a wireless transmit/receive unit (WTRU), user equipment (UE), a mobile station (MS), a mobile terminal, a mobile subscriber unit, a laptop, a non-mobile computing device (e.g., a desktop computer with wireless communication capability) or the like. In one or more aspects, a non-AP STA may act as an AP (e.g., a wireless hotspot).

In one aspect, an AP is a functional entity for providing access to a distribution system, by way of a wireless medium, for an associated STA. For example, an AP may provide access to the internet for one or more STAs that are wirelessly and communicatively connected to the AP. In FIG. 1, wireless communications between non-AP STAs are made by way of an AP. However, when a direct link is established between non-AP STAs, the STAs can communicate directly with each other (without using an AP).

Figure 2:
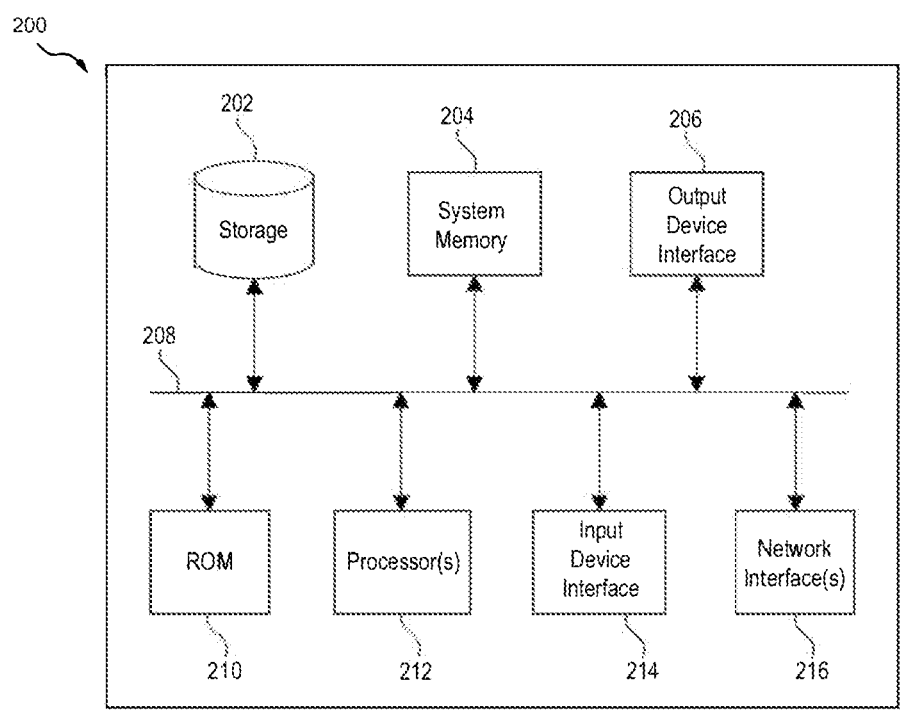
FIG. 2 is a block diagram illustrating components of an electronic system with which aspects of the subject technology can be implemented.

FIG. 2 conceptually illustrates an electronic system with which aspects of the subject technology described herein and in the attached appendices can be implemented. The electronic system 200, for example, can be a network device, a media client, an internet protocol (IP) set-top box (STB), a desktop computer, a laptop computer, a tablet computer, a server, a switch, a router, a base station, a receiver, a phone, or generally any electronic device that transmits signals over a network. Such an electronic system 200 includes various types of computer-readable media and interfaces for various other types of computer-readable media. The electronic system 200 includes a bus 208, one or more processor(s) 212, a system memory 204, a read-only memory (ROM) 210, a permanent storage device 202, an input device interface 214, an output device interface 206 and a network interface 216, or subsets and variations thereof.

The bus 208 collectively represents all system, peripheral and chipset buses that communicatively connect the numerous internal devices of the electronic system 200. In one or more implementations, the bus 208 communicatively connects the one or more processor(s) 212 with the ROM 210, the system memory 204 and the permanent storage device 202. From these various memory units, the one or more processor(s) 212 retrieve instructions to execute and data to process in order to execute the processes of the subject disclosure. The one or more processor(s) 212 can be a single processor or a multicore processor in different implementations. In one or more implementations, the one or more processor(s) 212 can implement various processes and methods of the subject technology. The one or more processor(s) 212 may also implement the functionalities of the first block 220 and 240 of FIG. 2.

The ROM 210 stores static data and instructions that are needed by the one or more processor(s) 212 and other modules of the electronic system. The permanent storage device 202, on the other hand, is a read-and-write memory device. The permanent storage device 202 is a non-volatile memory unit that stores instructions and data even when the electronic system 200 is off. One or more implementations of the subject disclosure use a mass-storage device (such as a magnetic or optical disk and its corresponding disk drive) as the permanent storage device 202.

Other implementations use a removable storage device (such as a floppy disk, flash drive and its corresponding disk drive) as the permanent storage device 202. Like the permanent storage device 202, the system memory 204 is a read-and-write memory device. However, unlike the permanent storage device 202, the system memory 204 is a volatile read-and-write memory, such as random-access memory. System memory 204 stores any of the instructions and data that the one or more processor(s) 212 need at runtime. In one or more implementations, the processes of the subject disclosure are stored in the system memory 204, the permanent storage device 202 and/or the ROM 210. From these various memory units, the one or more processor(s) 212 retrieve instructions to execute and data to process in order to execute the processes of one or more implementations.

The bus 208 also connects to the input device interface 214 and the output device interface 206. The input device interface 214 enables a user to communicate information and select commands to the electronic system. Input devices used with the input device interface 214 include, for example, alphanumeric keyboards and pointing devices (also called cursor control devices). The output device interface 206 enables, for example, the display of images generated by the electronic system 200. Output devices used with the output device interface 206 include, for example, printers and display devices, such as a liquid crystal display (LCD), a light-emitting diode (LED) display, an organic LED display, a flexible display, a flat-panel display, a solid-state display, a projector, or any other device for outputting information. One or more implementations include devices that function as both input and output devices, such as a touchscreen. In these implementations, feedback provided to the user can be any form of sensory feedback, such as visual, or tactile feedback; and input from the user can be received in any form, including acoustic, speech, or tactile input.

Finally, as shown in FIG. 2, the bus 208 also couples the electronic system 200 to one or more networks (not shown) through one or more network interfaces 216. In this manner, the computer can be a part of one or more networks of computers (such as a LAN), a wide-area network (WAN), or an intranet, or a network of networks, such as the Internet. Any or all components of the electronic system 200 can be used in conjunction with the subject disclosure.

Extremely high throughput (EHT) non-AP STA devices will have operating conditions with restrictions on transmit (TX) and receive (RX) behavior (e.g., simultaneous TX/RX might be restricted for certain link channel combinations for non-AP STA, aka Synchronous mode, aka NSTR (Non Simultaneous Transmit and Receive) links). When a Synchronous STA starts a TX on a first link (e.g., Link1), medium state of a second link (e.g., Link2) is lost, the pair of links is called NSTR. In aspects of the disclosure, mechanisms and rules to maintain the Link2 medium state during Link1 TX operation are provided. For example, one mechanism is to synchronize physical layer protocol data units (PPDUs) on both links.

Terms used throughout this paper are defined below.

Multi link device (MLD) is a device that can perform transmissions and receptions on more than one wireless interface link.

Asynchronous multi link device (AMLD) is an MLD that, during transmission on one link is able to assess the medium condition on at least one other link according to the required performance limit of receiver minimum sensitivity, that is, those two links are asynchronous links.

Synchronous multi link device (SMLD) is an MLD that, during transmission on one link is unable to assess the medium condition on at least one other link according to the required performance limit of receiver minimum sensitivity, that is, those two links are synchronous links.

An MLD may have N links for which the relationship of any two links may be either Synchronous or Asynchronous.

Enhanced distributed channel access (EDCA).

EDCA backoff suspended link (EBSL) is a link of an MLD for which EDCA has been suspended because a transmission by the same MLD on another link has caused an inability to assess the medium condition on this link within the required performance limit of receiver minimum sensitivity.

Extremely high throughput set of station (EHT STA) is an STA that conforms to the Extremely High Throughput definition of 802.11 TGbe.

Synchronized links base station subsystem (SLBSS) is a BSS in which MLDs are instructed to attempt to create synchronous transmissions between links.

Media access control protocol data unit (MPDU).

In aspects of the disclosure, the rules described herein will assume the case of N links, with N=2. In aspects of the disclosure, the rules can be extended to cover larger cases of N. The following rule sets are A Rules related to alignment, B Rules related to backoff and C Rules related to clear to send (CTS) and CTA.

In A Rule 1, an MLD shall advertise whether it is operating as an SMLD or AMLD for a given pair of links, where the advertisement is dynamic (e.g., the relationship may change). Also, an AP MLD shall indicate whether any synchronous mode MLD are operating in the BSS. Here, the AP shall indicate the condition in Beacons and Probe Response, the existence of the condition invokes the use of A Rules, B Rules and C Rules, and the mode of operation is SLBSS.

In A Rule 2, an MLD that transmits a PPDU on a link to an MLD may request the MLD to transmit a trigger on another link eliciting a response from the MLD on that other link, where An MLD that receives a request for a trigger may send such a trigger. Also, An MLD that is receiving a PPDU from an SMLD on Link1 may send a trigger to the same SMLD on Link2. Here, the trigger shall include an uplink (UL) length field value that elicits a response transmission whose last symbol end time matches the last symbol end time of the PPDU on Link1 and the trigger may elicit a single user (SU) PPDU or a high-efficiency trigger-based (HE TB) PPDU.

In A Rule 3, a non-AP MLD may transmit up to one trigger per link that is addressed to one user per link, including TRS type triggers. Also, an MLD that has received two PPDUs with the same end time from one or more MLDs on two links should ensure that the transmitted response PPDUs have the same end time. Further, An MLD that transmits a response to an MLD may include a trigger in the response that elicits a PPDU from a different MLD or from the same MLD, with the intent of causing alignment of the elicited PPDUs.

In A Rule 4, an MLD that initiates transmission of a PPDU on a link should attempt to align the end of the last symbol of the transmission with the last symbol of any ongoing transmission on the other link, such as if the associated AP MLD of the MLD has indicated that synchronous alignment is requested within the BSS. Also, an AP MLD shall indicate that synchronous alignment of transmissions is requested within the BSS if at least one associated MLD is operating in synchronous mode. Here, the indication is a dynamic indication and shall appear in the operation information of Beacons and Probe Responses.

In A Rule 5, an MLD that initiates transmission of a PPDU on a link during an ongoing transmission on the other link should attempt to trigger the response to the PPDU to align with the response to the ongoing transmission. For example, by predicting the response length of the ongoing transmission and by examining the trigger information from the ongoing transmission and using the trigger information to directly determine the length for the response transmission on the other link.

In A Rule 6, an MLD that initiates transmission of a response PPDU on a link should attempt to align the end of the last symbol of the transmission with the last symbol of any ongoing transmission on the other link. This occurs if the associated AP MLD of the MLD has indicated that synchronous alignment is requested within the BSS, and includes aligning with its own transmission.

In A Rule 7, inserted triggers should be repeated in multiple MPDUs within a PPDU to allow opportunity for third parties to receive the information and use it for alignment of their transmissions. Inserted triggers should also be included as a separate trigger MPDU, at the start of the PPDU to be identified early when decoding is possible. Inserted triggers should also be indicated in a new PHY Header field Response Length.

In A Rule 8, a first new PHY Header field is added (e.g., response length) and a second new PHY Header field is added (e.g., "Transmitting MLD is a synchronous mode MLD").

In A Rule 9, everything is made simpler if one link is simply always operated as Trigger-only. Here, the STA that is transmitting the trigger can only transmit a trigger if it knows the condition on the other link and it creates a trigger that causes PPDU alignment on the triggered link with the ongoing PPDU on the non-triggered link.

In A Rule 10, an MLD that has received two PPDUs with different end times from one or more MLDs on two links should attempt to ensure that the transmitted response PPDUs have the same end time.

In B Rule 1, an SMLD shall suspend EDCA backoff countdown on a link when a transmission by the same SMLD on another link has caused an inability to assess the medium condition on this link within the required performance limit of receiver minimum sensitivity. Here, network allocation vector (NAV) counters and PHY Length based BUSY indication shall not be suspended and the link is called an EBSL.

In B Rule 2, an EBSL of an SMLD shall remain suspended until the near end cross talk (NEXT) disappears and 1) minimum medium observation time (MMOT) is performed or 2) a BUSY medium indication is detected using either frame detection or energy detection, or received Medium State Information, before MMOT time has elapsed, where medium observation time for a link is time during which there is no transmission on an interfering link, and during which there is an attempt to ascertain the state of the medium through detection of frame transmissions of other devices and energy detection (ED).

In B Rule 3, an SMLD monitors the medium on both Link1 and Link2 while not transmitting on either link. Here, if the SMLD begins a transmission on Link1, then on Link2 1) the Intra NAV and Basic NAV counters continue to count down if not already at zero, 2) any BUSY indication that is asserted as a result of a PHY Length field value is maintained per the PHY Length field value and 3) if the Link1 to Link2 NEXT allows ED operation on Link2 according to the ED threshold, ED operation continues on Link2 (e.g., if the NEXT is above the ED threshold, Link2 shall be indicated as BUSY for the duration of the NEXT). In B Rule 3, there is also an optional transmission allowance. Here, if the Link2 Intra NAV and Basic NAV both are at or reach 0 and any PHY Length field value based BUSY indication has reverted to IDLE and NEXT is below the ED threshold and the ED indicates IDLE, then the SMLD may transmit on Link2 at distributed coordination function (DCF) interframe space (DIFS) following the transition from BUSY to IDLE of the last of the aforementioned items to have attained its zero or IDLE state, a PPDU from the AC with the lowest current backoff countdown value.

In B Rule 4, a STA performing EDCA on a link for which MLO Synch Rules are enabled should 1) suspend the EDCA function if the start of a preamble is detected on another link of a set which is operating synchronously and 2) resume EDCA function after the PHY header length information has been decoded, or has failed to be decoded, where at this resumption, no AIFS needs to be performed before resuming the countdown of IDLE slots. Also, if a STA does not suspend its EDCA function at the start of a preamble on another link of a set which is operating synchronously, then the STA shall use RTS-CTS or RTS-CTA or RTS-Trigger when it accesses the medium on that link and obey the timing constraints received in those frames.

In B Rule 5, an MLD operating synchronously may provide Medium State Information to another STA.

In C Rule 1, an EHT STA that receives a CTS in response to an RTS, where the duration (DUR) field value of the CTS is not equal to RTS DUR field value minus 2×SIFS (short interframe space) minus CTS Time (e.g., where CTS Time is the amount of time required to transmit the PPDU containing the CTS), shall ensure that the sum of 2×SIFS plus (e.g., the length in time of the Data PPDU that it transmits in response to the receipt of the CTS and the length of the PPDU that is elicited in response to the Data PPDU) is equal to the value of the DUR field of the CTS. Here, a value of 0 may be included in the CTS to indicate 1) RTS recipient cannot accept the expected Data PPDU at this time, 2) RTS transmitter should not assume collision failure or bit error rate (BER) failure, and/or 3) RTS transmitter may retain current contention window (CW) in the backoff process instead of CW increment in response to CTS failure.

In C Rule 2, CTA response to RTS are allowed. Here, CTA includes DUR field as in CTS and specific information for the following frame including PPDU duration, MCS, TX power, other parameters that would normally be found in a trigger frame, and duration of the BA or other elicited response frame. Also, CTA recipient transmits a PPDU according to the trigger-like information, including a trigger in the PPDU that triggers a response that corresponds to the response duration from the CTA.

In C Rule 3, RTS recipient may respond with 1) trigger instead of CTS or CTA and 2) choice of responding with trigger can be made based on RTS RA value, where i) RA is set to the unique MLD address of the RTS recipient (i.e., an RTS transmitter that addresses the RTS to the MLD address is capable of receiving a trigger in response) and/or ii) a RTS recipient may choose to attempt to transmit a Trigger in response to an RTS without knowledge of the ability of the RTS transmitter to receive such a sequence (e.g., it might just work).

Figure 3:
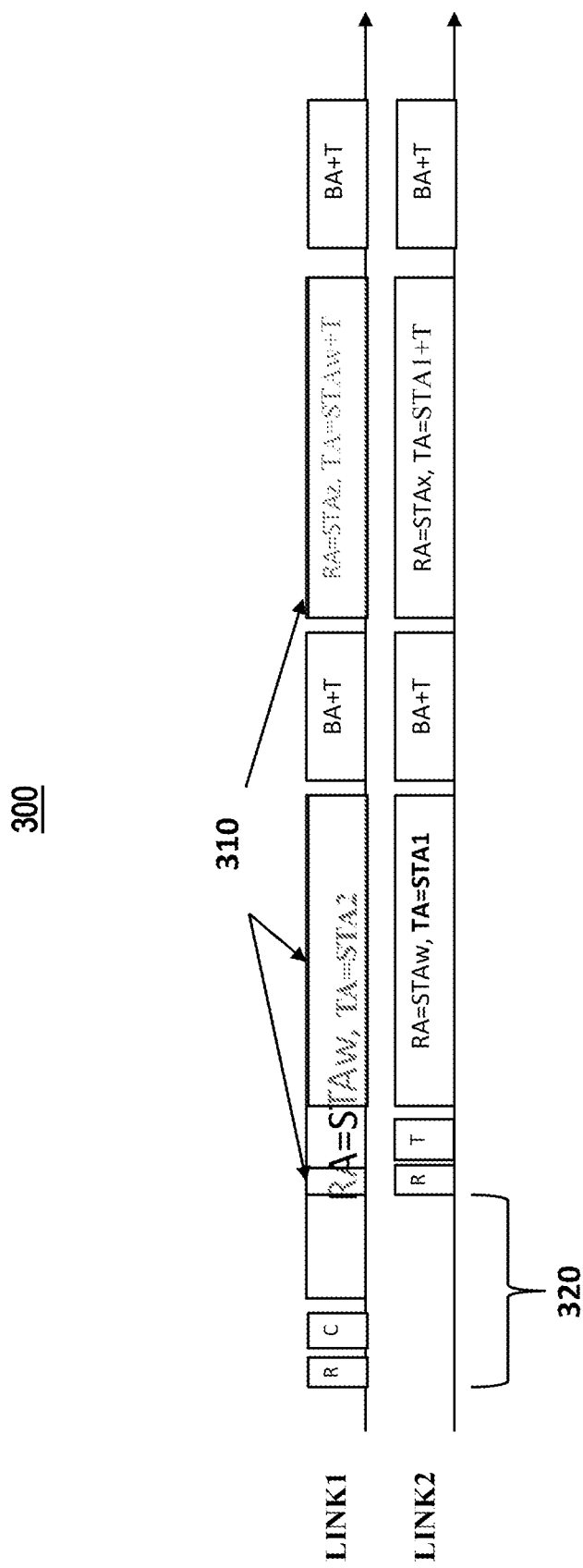
FIG. 3 is a schematic diagram illustrating a request to send (RTS) trigger sequence, according to aspects of the disclosure.

FIG. 3 illustrates an RTS trigger sequence 300, where the potential loss of MPDUs 310 in Link1 is not of concern and an EDCA 320 is shown at the beginning of transmission of the RTS on Link2 (RTS is the frame marked "R"). In the trigger response to RTS, marked "T", Link1 recipient either wins contention on Link2 and transmits a Data PPDU that matches the duration of the Link1 transmission (not shown) or receives an RTS from some other STA and responds with a trigger to force alignment of that STA transmission with the Link1 PPDU, as shown. Frames marked "C" are CTS. "BA" is a block acknowledgement frame. "BA+T" is a block acknowledgement combined with a trigger. RA is the receiver address of a frame. TA is the transmitter address of a frame.

In consideration of trigger versus TRS, all discussions referring to trigger frames can be extended to TRS, where TRS is a shortened form of a trigger that is included in an A-control field.

In aspects of the disclosure, trigger modifications of the trigger frames described in the IEEE 802.11ax draft amendment are provided. For example, any STA is allowed to transmit a trigger (e.g., not only an AP is allowed to transmit a trigger) either in response to an RTS or as an initial PPDU of a transmit opportunity (TXOP). The trigger should include parameters that cause the triggered PPDU to align with a PPDU on another link. The trigger is modified to include a field to indicate that the response to the trigger is an SU PPDU (e.g., instead of an HE TB PPDU). An existing MU trigger may still be used for this purpose. The trigger may trigger more than one user to respond, in which case, the response would be HE TB PPDU, not SU PPDU.

As another example, the trigger is modified to allow the trigger to specify that the recipient is allowed to choose some of the parameters of the trigger response PPDU (e.g., the trigger includes some means to signal that specific parameters are to be chosen by the trigger recipient, parameters, such as MCS, received signal strength indicator (RSSI) Target, Spatial Reuse, however the PPDU duration must be present and must be used by the trigger recipient in order to align the PPDU with the PPDU on other link(s). Also, CS is not required for the response to the trigger that is a response to RTS, because when RTS was used to solicit the trigger, both RTS and trigger examined the medium before TX, so that the CS requirement is already satisfied.

The RTS trigger sequence 300 may thus be useful. For example, there is a need to correctly receive the long training, short training, Legacy Signal (LSIG) field from a DATA PPDU on one link to determine the PPDU length to allow a device to synchronize the PPDU end times on other links. But if 1) the RTS transmitter only see the CTS, but not the DATA PPDU or 2) the RTS transmitter's two link MACs do not talk to each other (e.g., then the RTS transmitter does not have the information that allows it to synchronize it's Link2 PPDU end time with the PPDU end time of Link1. Though, the use of the trigger solves these issues, there is a period of ignorance to consider between the start of the exchange on Link1 and the determination of the duration of the DATA PPDU on Link1. During that period of time, a device transmitting a trigger on Link2 does not have sufficient information to be able to determine a correct value of duration to include in the trigger to create the desired alignment.

In addition, when the RTS DUR field value causes NAV to be set at third party STAs, the trigger might not allow a transmission covering the entire NAV duration set by the RTS so the third party STAs might be stuck with NAV< >0 after the triggered exchange is completed (e.g., those STAs are locked off of the channel for the difference between the RTS DUR field value and the triggered time amount following the completion of the triggered exchange). In order to avoid this problem, the RTS DUR field value should be a shorter value and the trigger response and subsequent DATA PPDU can provide longer DUR field values to provide the correct NAV setting, since the trigger response will dictate the final duration. But a disadvantage is that the RTS receiver does not know how much time the RTS transmitter needs, because the DUR is short. If the Link1 RTS-CTS exchange was observed before the start of the exchange on Link2, then the Link2 RTS should use the same NAV as the Link1 exchange, accounting for the passage of time between the receipt of the Link1 RTS and the transmission of the Link2 RTS.

Figure 4:
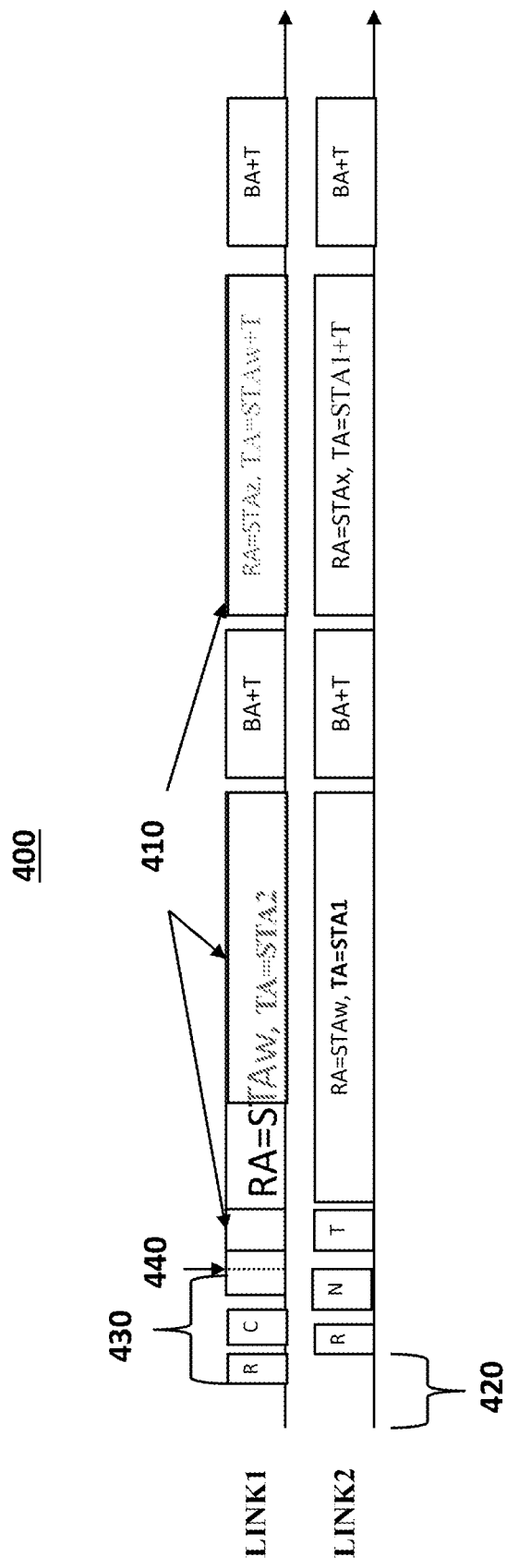
FIG. 4 is a schematic diagram illustrating a delayed trigger sequence, according to aspects of the disclosure.

In aspects of the disclosure, FIG. 4 illustrates a delayed trigger sequence 400, where the potential loss of MPDUs 410 in Link1 is not of concern because the transmitter of the trigger on Link2 is operating with asynchronous links and an EDCA backoff process 420 determines the next transmitter as shown preceding the frame exchange of Link2. As shown, if the Link2 EDCA backoff of a STA waiting to transmit an RTS expires in the window from Link1 start of RTS to completion of Link1 Data PPDU LSIG field, then Link1 PPDU LSIG length is not available within window 430 for use in the trigger frame on Link2. Thus, a responder to RTS can use techniques to delay the trigger transmission until it has the LSIG length information at point 440 to allow it to determine an appropriate value of duration to include the in the trigger. For example, the responder may send a Null Data Packet (NDP) or two, or otherwise keep the Link2 medium BUSY for a long enough duration to reach point 440 and then transmit the trigger once the LSIG length is known and can be used to correctly determine the trigger frame uplink (UL) Length field value that will create the desired alignment of the PPDU that is transmitted in response to the trigger.

Figure 5:
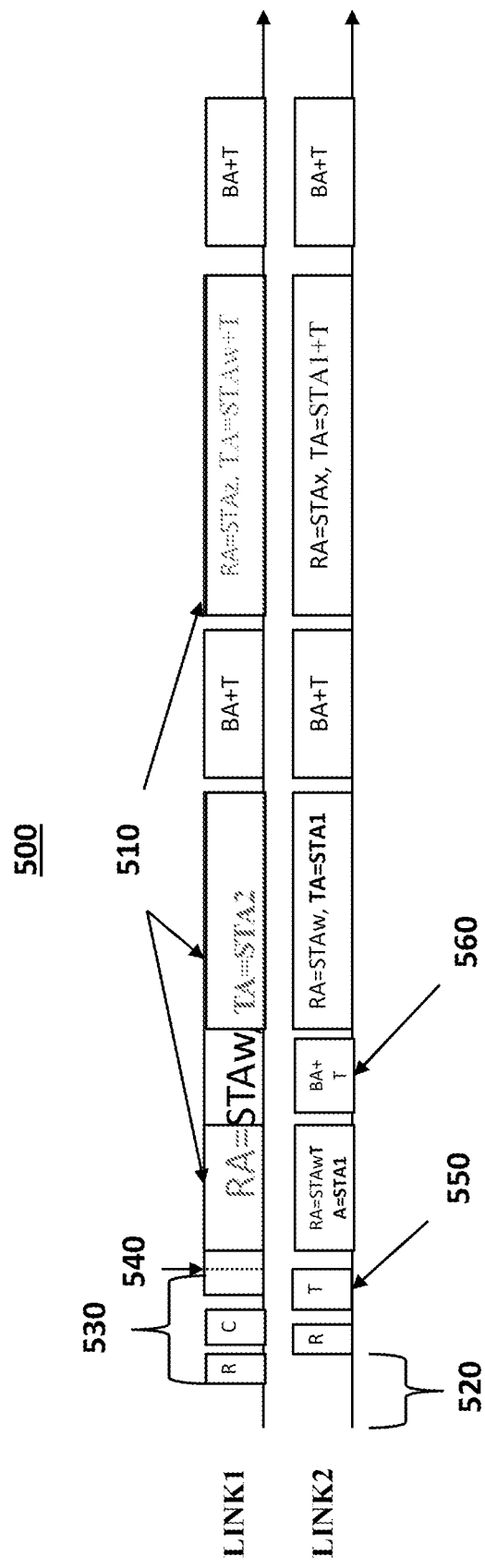
FIG. 5 is a schematic diagram illustrating a short physical layer protocol data unit trigger sequence, according to aspects of the disclosure.

In aspects of the disclosure, FIG. 5 illustrates a short PPDU trigger sequence 500, where the potential loss of MPDUs 510 in Link1 is not of concern and an EDCA backoff process 520 is shown at the beginning of the frame exchange on Link2. Similar to FIG. 4, Link1 PPDU LSIG length is not available in window 530 and LSIG length information becomes available to the trigger transmitter only at point 540. However, here a short trigger 550 (e.g., trigger that elicits a short response) is provided in response to the RTS. This is followed up with an alignment trigger 560 (e.g., trigger that forces an alignment with another link) that matches the remainder of the Link1 PPDU. The short trigger allowed the medium to be utilized during the time that the transmitter of the trigger needed in order to obtain the information from Link1 to then determine the trigger frame UL Length field value that creates the desired alignment of the PPDU that is transmitted in response to that trigger.

In aspects of the disclosure, when the AP indicates SLBSS Mode of operation, all STAs associated with the AP should initiate TXOPs with RTS. This may be optional, if for example, the initiating STA has received PPDU length information from a link that is synchronous to the link on which it is initiating the TXOP. In this case, the initiating STA can align its transmission end time to the ongoing PPDU end time without the need for assistance from a trigger.

In aspects of the disclosure, conflict resolution is provided. For example, when STA1 tries to force alignment by STAx, STAx might have its own TX/RX issues and might want to force alignment by STA1. To resolve the conflict, the first frame transmitted in time determines priority of alignment. This means that no request translates to a requirement and each STA receiving instructions can decide on its own to obey or not.

In aspects of the disclosure, rules assuming PPDU SMLD indication are provided. These rules are written assuming that each PPDU carries an indication of whether the transmitter of the PPDU is SMLD or not. Here, an MLD shall enforce PPDU end time alignment of a new transmission on Link2 with the PPDU end time of an ongoing transmission on Link1 if either 1) the Link1 transmission indicates that the source of the transmission is an SMLD or 2) the transmitter on Link2 is an SMLD.

In aspects of the disclosure, any of the aforementioned information for PHY Header or other information for triggering can be placed 1) in an A-control field of an MPDU, 2) within a trigger frame, 3) within a new frame, or 4) within the PHY header.

As discussed above, EHT non-AP STA devices (e.g., devices conforming to IEEE draft 802.11be) will have operating conditions with restrictions on TX/RX behavior such that when a Synchronous STA starts a TX on Link1 the ability to correctly determine the medium state of Link2 is significantly impaired. In aspects of the disclosure, a mechanism to maintain the Link2 medium state during Link1 TX operation is that the recipient of the Link1 TX supplies Link2 state information to the transmitter of the Link1 TX.

Figure 6:
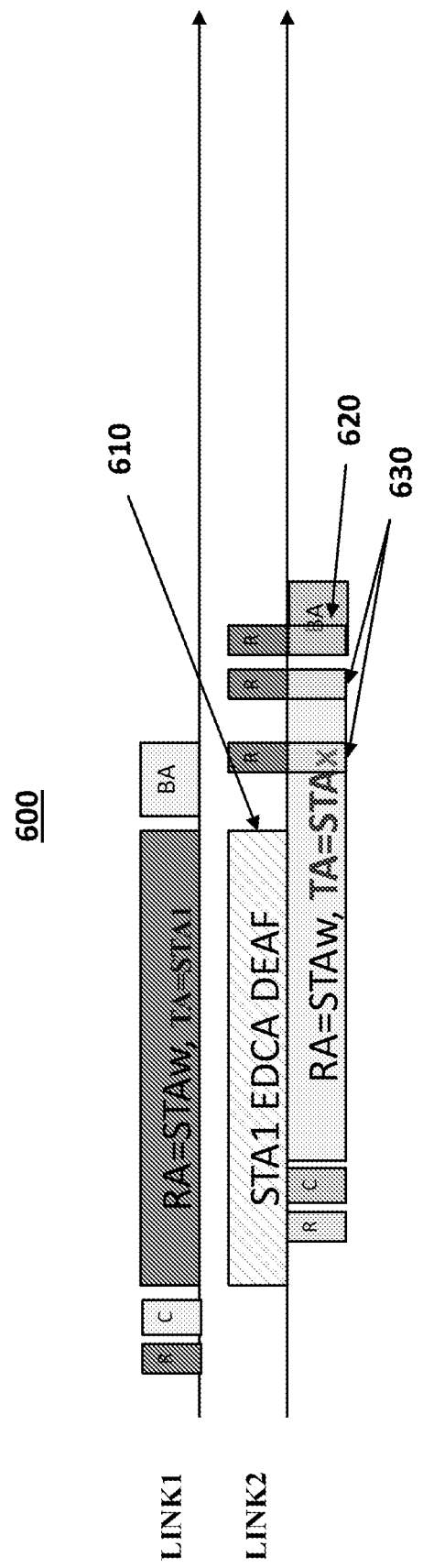
FIG. 6 is a schematic diagram illustrating an enhanced distributed channel access sequence, according to aspects of the disclosure.

For example, as shown in FIG. 6, there is often a synchronous transmitter EDCA issue to be overcome as shown by the EDCA-mediated frame exchange sequence 600. Here, the dark grey blocks are STA1 TX and all other blocks are STA1 RX. As shown, STA1 non-AP STA is the first TXOP winner as shown where STA1 begins a TX frame exchange on Link1 to STAw. When STAx attempts transmission to STAw during the STA1 Link1 TX, STA1 Link1 TX NEXT causes RX failure at STA1 Link2. At the end of TX on Link1, STA1 identifies Link2 as IDLE, unless the received energy of the TX on Link2 is greater than −62 dBm at STA1's location, though there is no rule on STA1 Link2 clear channel assessment (CCA) sensitivity during Link1 TX. Here, where it is assumed that the received energy of the TX on Link2 is less than −62 dBm, the STA1 Link2 EDCA Backoff quickly resumes at point 610 and counts down to 0, allowing a new TXOP attempt by STA1 on Link2 that begins with an RTS transmission marked as "R". The STA1 TX of an RTS on Link2 to STAw causes errors in the reception of the existing Link2 PPDU at points 630 at the recipient STAw (e.g., STAw=AP). Such errors might cause a modest loss of DATA as a long PPDU might include multiple blocks of separately verified data. But if the interference caused by the RTS transmission at point 620 results in incorrect decoding of the BA (Block Acknowledgement) frame, then the entire preceding DATA PPDU will be considered lost, resulting in severe degradation of system performance.

In aspects of the disclosure, Link2 medium state information (MSI) is provided to the MAC function operating on Link1. Here, the AP (STAw) knows that the Link1 transmitter STA1 is a synchronous mode STA, potentially as indicated by a bit included in the PHY header of the PPDU that the AP is receiving on Link1 so that the AP does not have to look up the information based on the TA value of the MPDU(s) in the PPDU. Although the AP is an asynchronous device in FIG. 6, STAw could be any asynchronously operating device (e.g., a non-AP). The AP provides medium state information for Link2 to STA1 in the response to the STA1 TX to the AP. For example, the AP provides Duration/End time information of the concurrent Link2 PPDU and Duration/End time information of the concurrent Link2 NAV within its BA response to STA1 on Link1, or within the PPDU that contains the BA response. Thus, an MSI conveyance may be a new PPDU built to hold this MSI information, a Null Data PPDU with an A-control field that contains the MSI information and/or within a PHY Header field constructed to hold MSI information.

Figure 7:
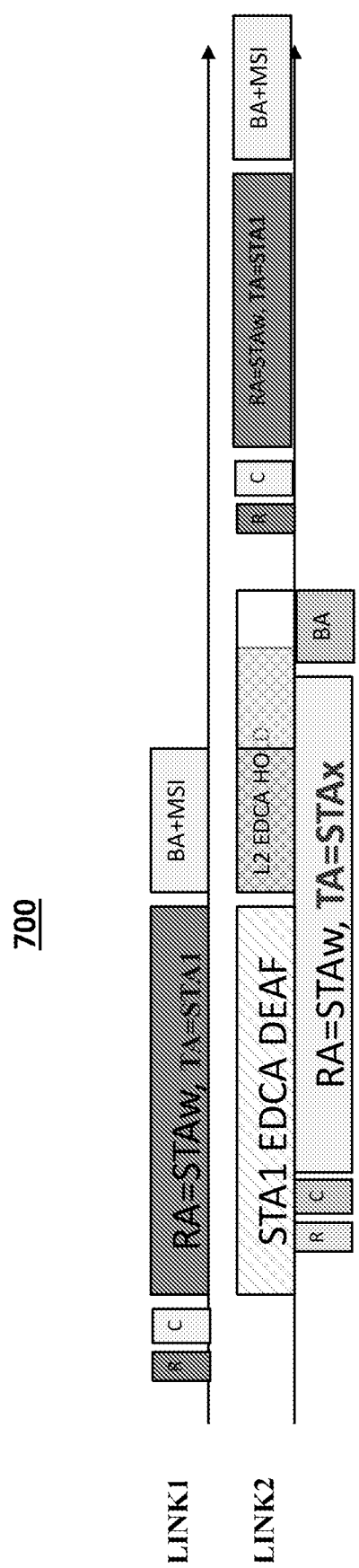
FIG. 7 is a schematic diagram illustrating a synchronous transmitter enhanced distributed channel access sequence, according to aspects of the disclosure.

As shown in FIG. 7, a synchronous transmitter EDCA sequence 700 illustrates a solution according to aspects of the disclosure. Here again, the dark grey blocks are STA1 TX and all other blocks are STA1 RX. As shown, STA1 receives MSI with BA on Link1. For example, STA1 cannot accurately determine the Link2 medium condition as IDLE until it has MSI information, STA1 Link2 deafness disappears at end of STA1 TX PPDU, STA1 MSI information is determined at end of STA1 RX PPDU BA+MSI, and STA1 should suspend EDCA until MSI information is available at the end of RX PPDU BA+MSI (e.g., L2 EDCA HOLD as shown in FIG. 6). Thus, STA1 uses MSI to adjust Link2 Medium State (e.g., set CRS, set NAV for Link2) and subsequent operation is per normal EDCA.

MSI wait time can cause problems. Because MSI information is in the response frame, it is not available when the Link2 deafness first disappears and if Link2 is IDLE at that time, then STA1 is performing an unnecessary EDCA hold (e.g., as long as MSI is not yet available).

According to aspects of the disclosure, a Link2 IDLE indication may be included in the PHY header. For example, when, per the information obtained at the BA transmitter location, Link2 is IDLE at the end time of the Link1 PPDU, the Link2 IDLE indication can be asserted in the PHY Header of BA+MSI. Thus, this information is available much earlier in the RX PPDU and it reduces the wait time for Link2 EDCA resynchronization.

In some aspects of the disclosure, MSI time in PHY Header could transform the Link IDLE information into a full wait time (e.g., simply put the Link2 BUSY duration in the PHY header of the response frame). Here, the value of 0 indicates Link2 IDLE and a non-zero value is equivalent to supplying Link2 remaining PPDU Length and/or Link2 remaining DUR NAV value (e.g., equivalent of a PHY header TXOP value but referring to another link, equivalent of PHY header MSI, or a subset of that MSI).

Figure 8:
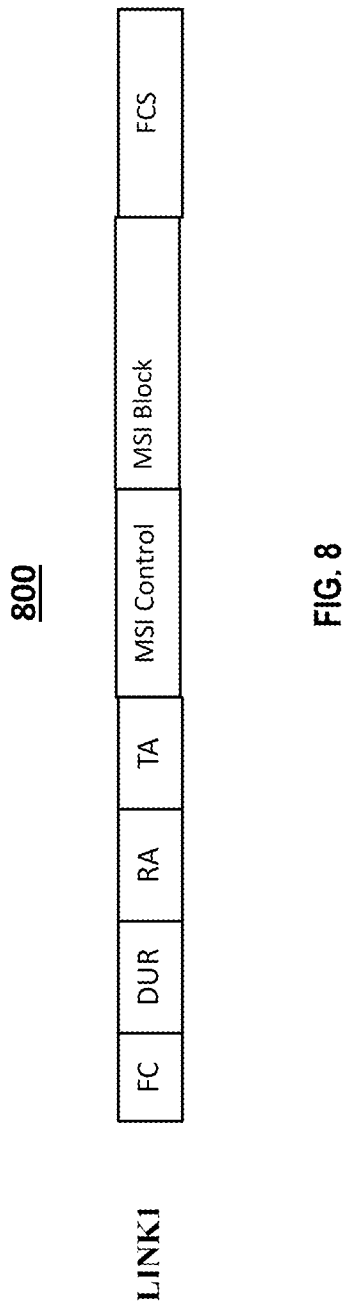
FIG. 8 is a schematic diagram illustrating the contents of a frame carrying cross link information, according to aspects of the disclosure.

As shown in FIG. 8, MSI is carried in an MSI Frame as an MPDU 800. Here, the MSI Control includes a bitmap that indicates the presence and absence of Medium State Information per link, where a "1" in the bitmap indicates that MSI is present for the link with link identification (LinkID) corresponding to the position of the bit in the bitmap and a "0" indicates that MSI is not present for the corresponding link. An MSI Block contains N copies of Per Link MSI, where N is equal to the number of bits in the MSI Control bitmap that are equal to "1" and the Per Link MSI fields that are present are arranged in ascending order of LinkID.

The Per Link MSI may contain three subfields. The first subfield MSI_NAV_INTRA includes the predicted value of the Intra NAV of the MSI MPDU transmitter for the corresponding link, at the end of the last symbol of the PPDU that carries the MSI MPDU. The second subfield MSI_NAV_BASIC includes the predicted value of the Basic NAV of the MSI MPDU transmitter for the corresponding link, at the end of the last symbol of the PPDU that carries the MSI MPDU. The third subfield MSI_LEN (length) includes the predicted value at the transmitter of the MSI MPDU, of a counter that counts down a PHY length field value following the reception of a valid PHY Header containing PHY length field information, for the corresponding link (e.g., remaining PHY length value at the MSI transmitter for the specified link at the end of the PPDU carrying the MSI).

The subfields may all have an unsigned positive value, with a minimum value of 0, where values may be expressed in microseconds or some larger unit of time. Alternatively, the subfields may have positive or negative values. A positive value indicates the time in the future, starting from the end of the PPDU that contains the MSI, when the indicated medium state variable is expected to change from BUSY to IDLE. A negative value indicates the time at which the indicated medium state was expected to have changed from BUSY to IDLE previous to the end of the PPDU. If a negative value is used, then the recipient may use the negative value to adjust its related EDCA parameter downward in relation to the magnitude of the value.

In aspects of the disclosure, the PHY Header may contain bits to indicate MSI IDLE, per link. For example, one bit per Link that indicates MSI IDLE or BUSY. Thus, if this bit indicates BUSY for the link, then the receiving MLD should examine received MPDUs in the same PPDU for more detailed information, e.g., MSI_NAV_BASIC, MSI_NAV_INTRA, MSI_LEN (e.g., a "1" indicates IDLE). The PHY Header may contain more complete MSI fields, per link (e.g., MSI_NAV_BASIC, MSI_NAV_INTRA, MSI_LEN as described in the MSI frame). An IDLE State is indicated by all fields having a value of 0.

In aspects of the disclosure, MSI receiver behavior may be provided. For example, an MLD that is operating in synchronous mode shall during transmission on a link, suspend EDCA operation on any other link on which the MLD is unable to assess the medium State according to the performance requirements of receiver minimum sensitivity. Here, suspend EDCA means to act as though the affected link is experiencing a medium BUSY State. For MSI Receiver MSI_LEN Counter, an MLD that operates in synchronous mode shall support MSI exchange and implement an MSI_LEN counter for each operating link, where the MSI_LEN counter for a link shall be set to the value of the received MSI_LEN field for that link and shall count down the appropriate units of time beginning at the end of the last symbol of the received PPDU which contained the MSI_LEN field and shall, while non-zero, imply a BUSY condition on that link, as per the IDLE state indication described previously.

In aspects of the disclosure, a STA that receives MSI for a specific link, shall, for that link 1) replace the Intra NAV counter value with the received MSI_NAV_INTRA value after appropriate scaling, if the scaled received value is greater than the Intra NAV value at the time of the end of the last symbol of the PPDU that contained the MSI MPDU, and 2) Replace the Basic NAV counter value with the received MSI_NAV_BASIC value after appropriate scaling, if the scaled received value is greater than the Basic NAV value at the time of the end of the last symbol of the PPDU that contained the MSI MPDU.

In aspects of the disclosure, subsequent to a transmission by an MLD on a link that required EDCA to be suspended on another link, the MLD may resume EDCA operation on the links on which it was suspended. For example, 1) at the end of a valid PHY signal field of a PPDU received on the link on which it was previously transmitting, when the received PHY signal field contains MSI indication for the suspended link (e.g., either full MSI information or an indication that the suspended link is IDLE), 2) at the end of the last symbol of a PPDU received on the link on which it was previously transmitting, when the received PPDU contained an MPDU that contained MSI for the suspended link, and 3) at any time after the end of the transmission, if it receives any valid PPDU PHY Header on the suspended link.

In aspects of the disclosure, if an MSI parameter for a link is received with a negative value in a PPDU, then the recipient of the MSI may perform an adjustment to its backoff process on the affected link (e.g., the backoff should be calculated at the end of the receipt of the PPDU containing the MSI, assuming that the magnitude of the negative value of the parameter is effectively that amount of IDLE time that has passed previous to the end of the PPDU). For example, if all MSI parameters indicate either 0 or a negative value, then at the end of the receipt of the PPDU, the recipient determines the earliest time, backwards from the end of the PPDU, at which all parameters had reached zero, representing a sum IDLE indication for the link, and the amount of time from that point forward in time to the end of the PPDU is an amount of time considered IDLE for that link which can be used to determine the current state of the EDCA for that link. This assumes that the EDCA for that link had resumed operation at the time when the link was determined to be IDLE (e.g., if the earliest time from the end of the PPDU that was determined to be IDLE according to the values MSI_INTRA_NAV==−70, MSI_BASIC_NAV==−140, MSI_LEN==−110, then the earliest IDLE backwards in time from the end of the received PPDU containing the MSI information is 70 microseconds from the end of the PPDU). The recipient can then adjust the backoff process(es) to account for the fact that 70 microseconds of IDLE medium has elapsed previous to the end of the PPDU reception. If the result of the adjustment is that an existing backoff function for the link would have reached 0 before the end of the received PPDU that contained the MSI values, then the recipient may examine the current medium condition using ED and Preamble detect for a period of one SLOT. If the medium is IDLE during that SLOT, then the recipient may initiate a transmission. If the medium is BUSY during that SLOT, then the recipient should restart each expired backoff function by choosing a new backoff number either 1) randomly or 2) by using the number that is equal to the number of backoff slots between the calculated IDLE medium start time and the end of the received PPDU, where this number is potentially different for each backoff function due to potential differences in the value of arbitration inter-frame space number (AIFSN) for each backoff function.

In aspects of the disclosure, subsequent to a transmission by an MLD on a link (e.g. Link1) that required EDCA to be suspended on another link (e.g. Link2), the MLD shall perform extended inter-frame spacing (EIFS) on Link2 starting from the zero time point of the time value determined from the MSI_LEN value, if the MSI included MSI_LEN information for Link2. Here, the MSI_LEN zero point might be in the past (e.g., MSI_LEN might have a negative value) or it might be in the future.

In aspects of the disclosure, a Synch Transmitter indication should be included in the PHY header of a PPDU so that the recipient of such a PPDU can prepare MSI to be included in the response. The indication in the PHY Header could be a single bit that indicates that the PPDU transmitter is operating using synchronous mode.

In aspects of the disclosure, unrelated transmission alignment (UTA) is provided. EHT non-AP STA devices can have operating conditions with restrictions on TX and RX behavior (e.g., Simultaneous TX/RX might be restricted for certain link channel combinations for non-AP STA aka Synchronous mode). A non-AP STA can attempt to control the timing of the start and/or end of a transmission, but cannot control the start and/or end of a reception (i.e., to minimize destructive overlapping activity). UTA helps to create alignment of the start and/or end times of unrelated transmission to reduce destructive overlaps.

In aspects of the disclosure, there are several EDCA rules for a Deaf Link (i.e., a link for which the device is unable to correctly determine the medium condition or state). 1) Link1 STA initiates TX, i.e., Link1 Backoff=0. 2) Link2 NO synchronous TX was possible (e.g., simultaneous Link2 Backoff=0 did NOT happen). 3) Link2 EDCA is deaf on Link2 (i.e., is unable to correctly determine the medium condition or state), due to Link1 TX inter device interference. Here, Link2 is indicated as medium BUSY during Link1 TX due to NEXT (Near End Cross Talk) and Link2 EDCA is in SUSPEND because of the BUSY indication. In some aspects of the disclosure, different implementations may not indicate BUSY. 4) Link1 TX finishes, the question then is, what happens on Link2? For example, if Link2 EDCA is out of synch with any other Link2 activity, can Link2 EDCA resume immediately or is a wait period required (e.g., similar to the wait period that is recommended when a device transitions from DOZE state to →AWAKE state). 5) Note that for a device that has inter device interference, Link2 goes deaf during every Link1 TX, and the resulting EDCA on Link2 is not a "real EDCA" and is undesirable as this is "partial EDCA" as the medium condition on Link2 is only temporarily partially correctly determined, i.e. only during those periods of time when there is no transmission occurring on Link1. For example, this is considered worse than Quasi-asynchronous mode (i.e., completely deaf versus partially deaf, i.e. where there is some partial ability to determine some aspects of the medium state on Link2 during a transmission on Link1, for example, ED might continue to operate within a small range of received energy that is between the level of interference from Link1 TX and the ED threshold).

In aspects of the disclosure, techniques for PPDU alignment between Link1 and Link2 make EDCA deafness not matter. That is, when PPDU alignment occurs, Link2 is required to indicate BUSY during Link1 TX, then when Link2 hearing is restored (i.e. deafness ends), a preamble is possibly starting or the medium has become free (i.e., once PPDUs are aligned, deaf Link2 EDCA remains in synch because the Link1 and Link2 PPDUs are in synch).

These techniques assume a STA with N links, where most discussions assume N==2. TX TX indicates that a given STA is transmitting on Link1 and transmitting on Link2 concurrently, though not necessarily overlapping completely (e.g., start and end times of the transmissions are not, at least initially, assumed to be aligned). In some aspects of the disclosure, there may be alignment of TX start and/or end times for various circumstances. TX RX indicates TX on one link, RX on the other link, not necessarily aligned. RX RX indicates RX on both links. RX TX indicates RX on one link, TX on the other link, the difference between TX RX and RX TX being related to which event began first in time.

The desired outcome of these techniques is to keep EDCA working effectively on all links, even in the presence of and at a synchronous mode STA. This is easier for two links and more difficult for three links. Also, with these techniques, a synchronous mode STA is able to use two (or N) LINKS simultaneously which can yield a significant increase in throughput and a reduction in latency. Here, the primary objectives are the TX TX and RX RX, scenarios and secondary objectives are the TX RX and RX TX scenarios.

Figure 9:
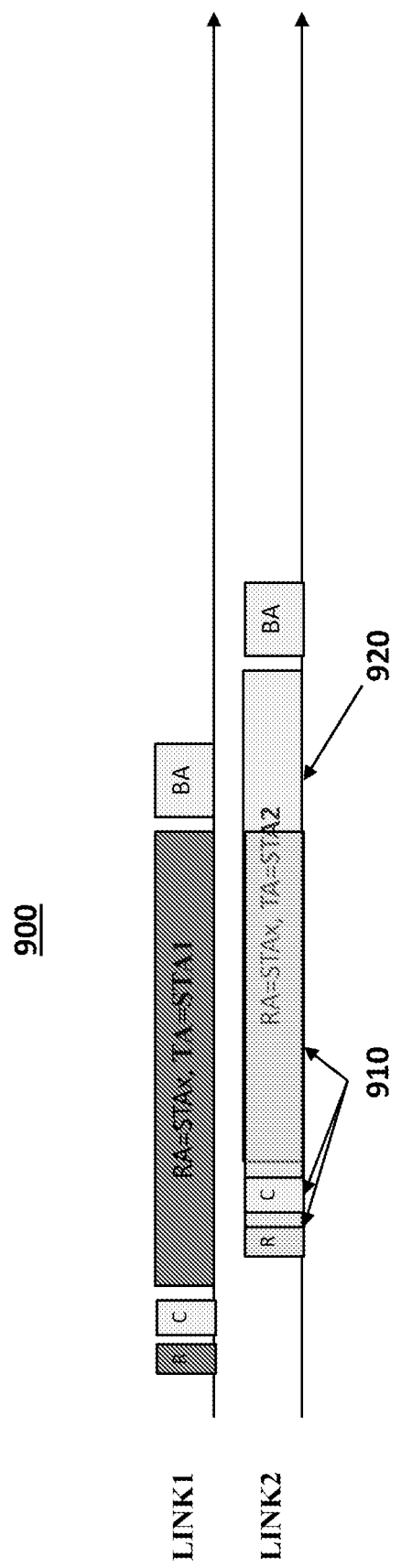
FIG. 9 is a schematic diagram illustrating a basic TX RX case, according to aspects of the disclosure.

FIG. 9 illustrates a basic TX RX case 900, in aspects of the disclosure. The dark grey areas indicate STA1 TX and all other areas indicate STA1 RX. Here, STA1 non-AP STA is the first TXOP winner and begins TX on Link1. STA2 attempts transmission to STAx during STA1 Link1 TX, where STA1 Link1 TX NEXT causes RX deafness on Link2. Also, this is a typical infrastructure UL (uplink) case (e.g., STAx is the AP of STA1, STA2, hence the transmissions are both uplink to the AP). Thus, STA1 Link2 becomes EDCA unsynchronized and STA1 might start a new TX on Link2 while STA2 is still actively transmitting on Link2. As shown, detection indicators 910 are indicated as points of STA1 potential failures to detect PPDUs, and idle indicator 920 illustrates where STA1 indicates medium IDLE, assuming that the received energy of PPDU detected by STA1 at idle indicator 920 is below the ED threshold (e.g., a typical value is −62 dBm).

Figure 10:
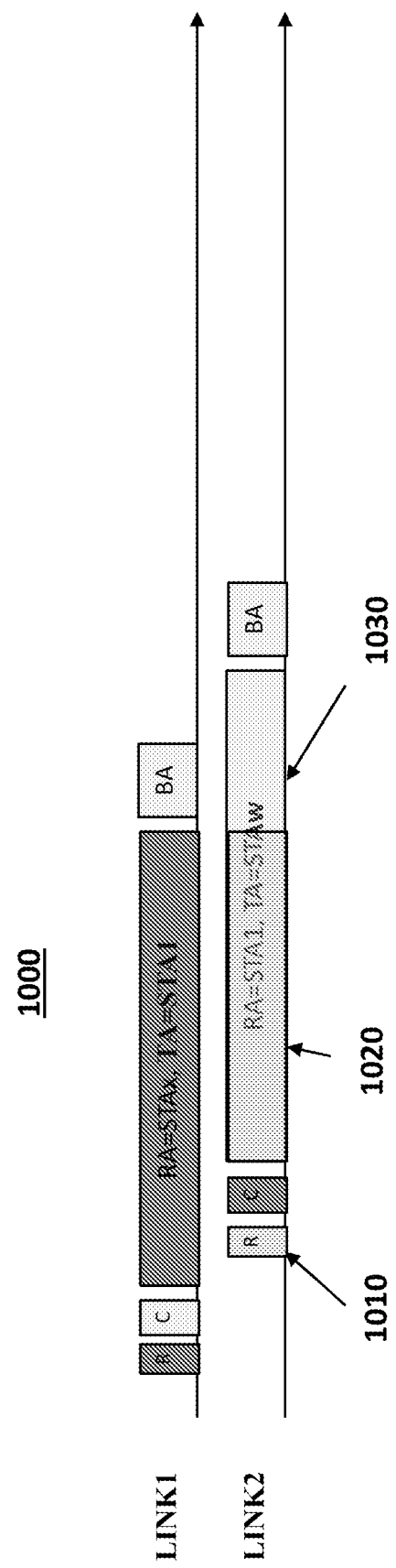
FIG. 10 is a schematic diagram illustrating an advanced TX RX case, according to aspects of the disclosure.

FIG. 10 illustrates an advanced TX RX case 1000, in aspects of the disclosure. The dark grey areas indicate STA1 TX and all other areas indicate STA1 RX. Here, STA1 non-AP STA is the first TXOP winner and begins TX on Link1. STAw attempts transmission to STA1 during STA1 Link1 TX, where STA1 receives RTS, sends CTS, but Link1 TX NEXT causes RX failure of Link2 Data PPDU. If STAw is the AP of STA1, then STAw would normally simply NOT start the indicated Link2 PPDU TX (i.e., If Link1 TX RA==AP of STA1, then AP examines TA and should not TX to STA1 on Link2), but in some instances, either the AP function of Link2 is unaware of the reception on Link1 or the information that identifies the transmitter of the PPDUs on Link1 is not available at the time of the RTS transmission on Link2. However, for a tunnel direct link setup (TDLS) case, the transmitter of the Link2 RTS is not the AP, but instead, some STA2 and STA2 might not be aware of the Link1 TX of STA1. In either case, STA1 can choose to not respond to the RTS being transmitted by STA2, knowing that it reception of the following data PPDU is likely to fail. Here, RTS might be vainly retried due to the missing CTS, STAw (or STA2) CW increases for the wrong reason (i.e. missing CTS is normally assumed to be due to contention, in which case the CW should be increased, but in this case, congestion is not the cause of the failure) and/or STAw (or STA2) assumes that MCS is incorrect or that STA1 has disappeared (i.e. is no longer operating on Link2). As shown, section 1010 indicates that RTS may be lost due to Link1 NEXT, section 1020 indicates potential loss of MPDUs and section 1030 shows STA1 indicates medium IDLE.

In aspects of the disclosure, it is provided to have a synchronous mode STA use two links at once (e.g., TX TX, RX RX). For example, for the TX TX case, TX+TX will not suffer harmful effects from self-interference and when non-AP STA1 acquires one link, say Link1 (e.g., STA1 Link1 TX begins), the issue here is how STA1 may simultaneously acquire Link2 for TX using EDCA on Link2 (i.e., Link2 EDCA goes deaf/BUSY when Link1 TX is active). The solution is through triggering by other STAw, where EDCA is examined at Link2 by the triggering STAw (e.g., STAw is asynchronous, and does NOT experience EDCA deafness on Link2 when transmitting on Link1), and allowing AP (STAw) and non-AP STA to perform a dual triggering operation as shown in FIG. 11.

Figure 11:
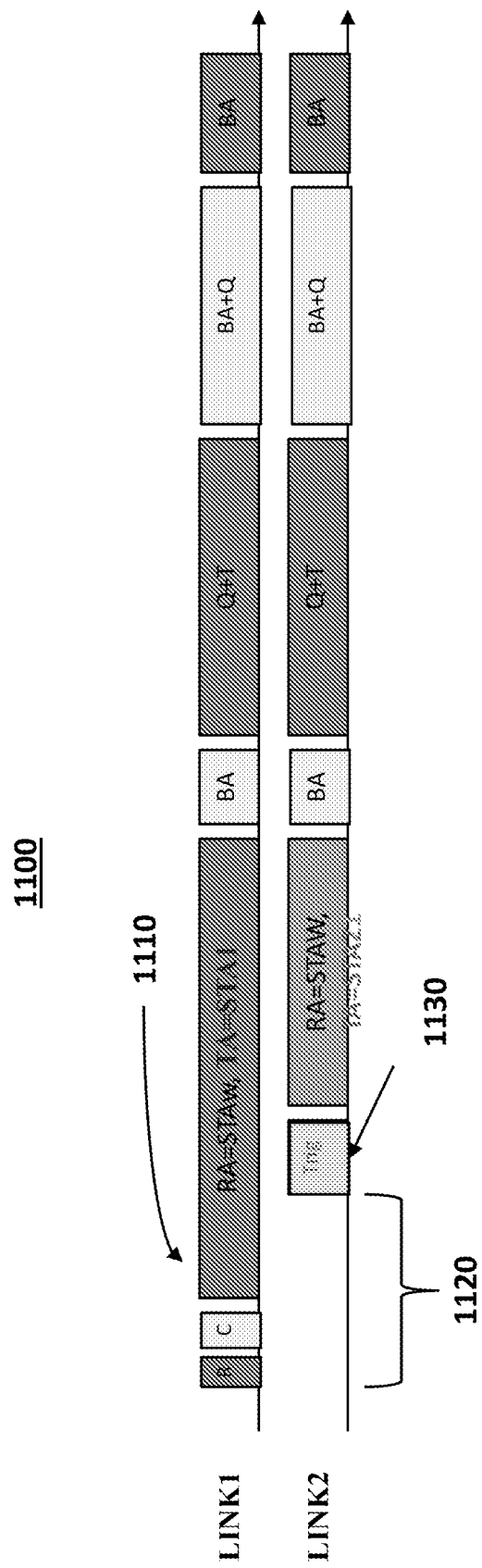
FIG. 11 is a schematic diagram illustrating a UTA TX TX triggered case, according to aspects of the disclosure.

FIG. 11 illustrates a UTA TX TX triggered case 1100. The dark grey areas indicate STA1 TX and all other areas indicate STA1 RX. Section 1110 indicates a frame exchange on Link1, section 1120 indicates STAw EDCA, and section 1130 indicates a potential loss of MPDUs, i.e., the loss of the trigger PPDU at STA1 due to STA1 Link1 TX. For this UTA TX TX triggered case, STA1 is the first TXOP winner and begins TX on Link1, where STA1 Link2 EDCA indicates BUSY due to NEXT from Link1 TX (e.g., STA1 Link2 EDCA must suspend) and STA1 may include a trigger request in its TX PPDU. Also, STAw continues to perform EDCA on Link2 indicated at 1120 (i.e., STAw is an asynchronous mode MLD), where STAw completes EDCA back-off and transmits a trigger indicated at 1130 (e.g., the Trigger indicates MCS, with a PPDU LENGTH that should line up the end time of the triggered PPDU with the end time of the ongoing Link1 TX). In addition, STA1 transmission on Link1 may include a request for triggering on other link, where a trigger not always receivable due to NEXT. Thus, a trigger request may account for NEXT (e.g., do not send trigger request if trigger will fail RX) and a request may include an MCS recommendation for the trigger or a recommendation for no trigger at all. When a trigger is transmitted to STA1, where AP, or non-AP STA (e.g. TDLS STA) transmit a trigger optionally, it should only transmit the trigger if it knows that the trigger is receivable (e.g. signal-to-noise-plus-interference ratio (SINR) estimate+MCS), only transmits if it knows that Synchronous mode STA1 can perform CS required check (e.g., Link1->Link2 NEXT level allows −72 dBm CS check at STA1 Link2), and includes triggered PPDU duration (UL Length) that matches the ongoing Link1 TX to line up PPDUs. When a trigger is not requested by STA1, STAw may transmit a trigger to a STA2 which is not transmitting on Link1 and therefore does not have NEXT on Link2 that will cause a failure to receive the trigger. In this case, the trigger includes triggered PPDU duration (UL Length) that matches the ongoing Link1 TX to line up PPDUs.

Additional UTA TX TX considerations include STA1 sending a requested trigger. Here, STA1 can send the request without full knowledge of the likelihood of receiving the trigger (i.e., let the trigger transmitter make the decision), where 1) if the trigger is transmitted to STA1, maybe it is not received, 2) if the trigger is received, maybe the STA1 does not respond, due to other considerations, such as new interference, and 3) trigger transmitter can defer the trigger transmission until later or transmit a trigger to a different STA. Also, instead of responding to a trigger request with a trigger, the requested device may transmit a CTS addressed to STA1, thus providing a similar outcome that provides permission for STA1 to transmit.

Figure 12:
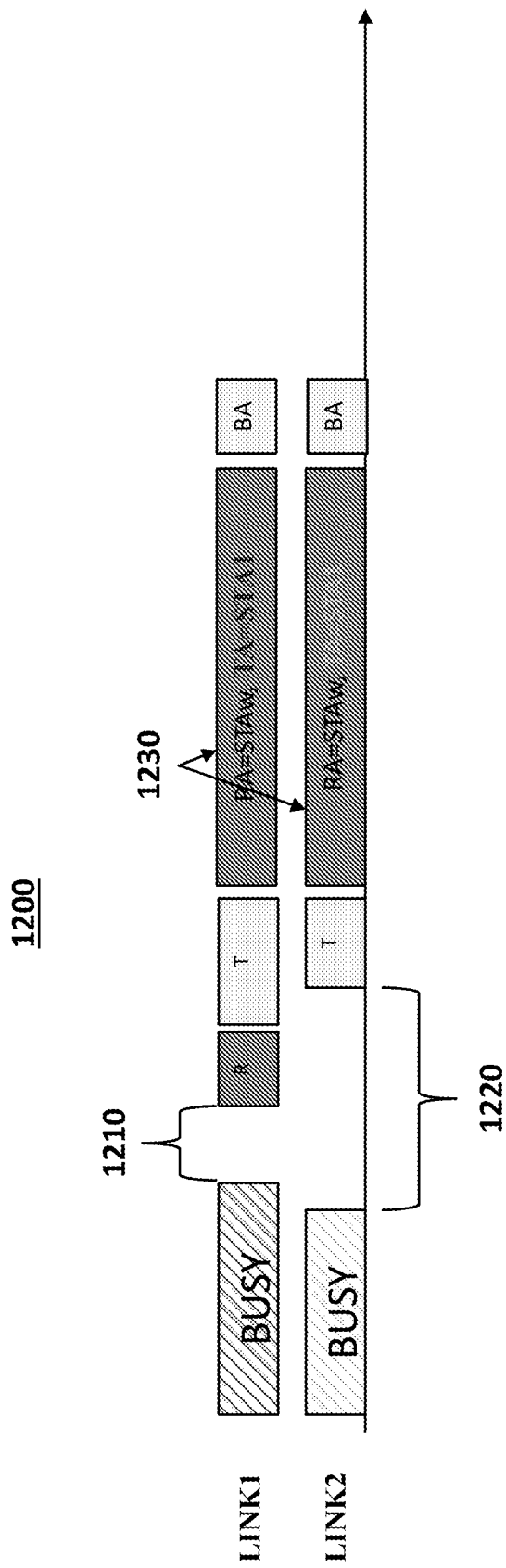
FIG. 12 is a schematic diagram illustrating a TX TX RTS trigger case, according to aspects of the disclosure.

FIG. 12 illustrates a TX TX RTS trigger case 1200. Section 1210 indicates STA1 EDCA counts down to 0 and begins a TXOP with an RTS transmission, section 1220 indicates STAw EDCA counts down to 0, and section 1230 indicates data PPDUs. For this TX TX RTS trigger case, the MLD AP has declared Link2 as triggered only, in order to more easily predict the future result of the Link2 EDCA backoff countdown, but this is not required. Also, STA1 is the first TXOP winner and begins TX on Link1 with RTS. Here, 1) STAw estimates time when backoff=0 on Link2 (e.g., potentially after the RTS reception), 2) STAw prepares a Link1 trigger response to the RTS based on the expected start time of the trigger on Link2 which is the time of Link2 EDCA backoff reaching 0, to align trigger PPDU end times (e.g., to create a Link1 trigger that is longer than it needed to be, but which has a length that accommodates the completion of the Link2 EDCA backoff and subsequent transmission of the trigger on Link2), and 3) STAw prepares Link1 and Link2 triggers to have identical elicited response PPDU end times, i.e. that have the same UL Length field value. Thus, Link2 EDCA backoff=0 time is fairly predictable because of trigger-only restricted operation on Link2. Also, data PPDUs potentially need TRS or trigger to ensure that BA response PPDU durations are equal for those cases when additional PPDUs are transmitted in the TXOPs on the links.

Figure 13:
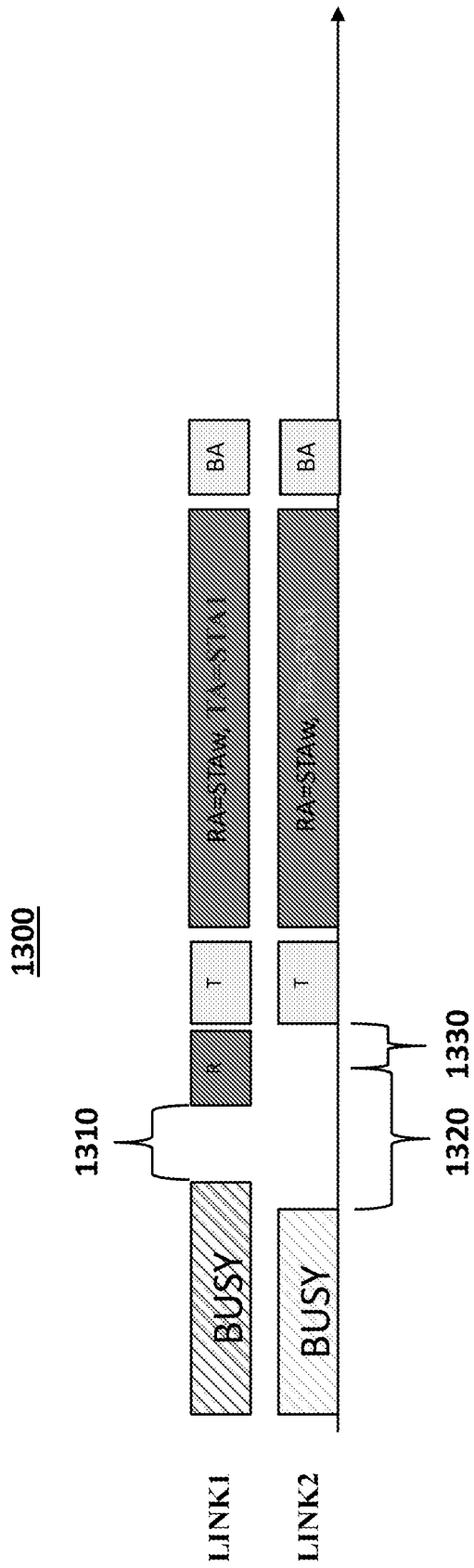
FIG. 13 is a schematic diagram illustrating another TX TX RTS trigger case, according to aspects of the disclosure.

FIG. 13 illustrates another TX TX RTS trigger case 1300. Section 1310 indicates STA1 EDCA counts down to 0, section 1320 indicates STAw EDCA counts down to 0, and section 1330 indicates STAw chooses to delay transmission on Link2. For this TX TX RTS trigger case, the MLD AP has declared Link2 as triggered only, in order to more easily predict the future result of the Link2 EDCA backoff countdown, but this is not required. Also, STA1 is the first TXOP winner and begins TX on Link1 with RTS. Here, 1) STAw sees the start of RTS transmission, 2) STAw Link2 backoff expires during or even before RTS reception (e.g., backoff on Link2 might have expired long before Link1 RTS reception begins), where in any case, STAw optionally waits for the outcome of the RTS reception before transmitting on Link2, 3) STAw detects an opportunity for parallel triggers to STA1 on Link1 and Link2, and 4) STAw transmits parallel triggers to STA1 on Link1 and Link2.

For these TX TX RTS trigger cases 1200, 1300, in general either 1) AP wins contention on Link1 and on Link2 either at the same time, or by delaying transmission on the first link on which contention is won and begins parallel, synchronized transmissions to one or more recipients or 2) a non-AP STA wins contention on Link1 and the AP responds to the RTS or request for trigger (RFT) transmitted by that winning STA with a trigger on Link1 and optionally also on Link2. This second option includes triggers with common end times, where the trigger on Link1 is sent to the RTS/RFT transmitter and the trigger on Link2 is sent to either the RTS/RFT transmitter or to another STA, and the AP optionally transmits data on Link2 to another STA that is in a PPDU with an end time synchronized to the end time of the Link1 transmission (e.g. TX RX case). Here, synchronized in this case means common start and end times of the PPDUs or at least, a common end time. It is generally preferred that contention is only performed on Link1 while Link2 is triggered only for uplink (i.e., transmission of data to the AP by non-APs), where the AP has normal access for downlink on Link2, but normally attempts to synchronize those downlink PPDU end times with end times of PPDUs on Link1.

Some additional TX TX rules may include that only one link follows normal EDCA operation for non-AP STAs (e.g., other link(s) are triggered only (i.e., number of links may be greater than 2.) Also, allow any STA to TX trigger (i.e., not only the AP), such as where a non-AP sends modified triggers only (i.e., no MU response PPDU, only SU PPDU transmissions in response to the trigger transmitted by a non-AP STA). In addition, it is generally preferred to maintain PPDU alignment between links (e.g., common start and end times of PPDUs, at least, common end times). Also, create an alternative to RTS (e.g., RFT request for trigger), which is similar to RTS, but also includes information in RFT regarding 1) whether the RFT transmitter desires a trigger on any other links, and if so, which links, and 2) the desired length of the trigger-elicited transmission(s). In some cases, the response to a triggered Link2 PPDU might not match the length of the response to the Link1 PPDU, in which case the technique may provide response length information in the trigger to ensure that the two responses match, though this is not necessary if the responder is the same on both links (e.g., if the responder is the same, then the responder should align response PPDUs' end times).

In aspects of the disclosure, the case of switching TXOP owners is provided, where if an AP estimates that the Link1 transmitter will not receive a trigger, then AP would likely trigger a different STA. Here, if an AP triggers a different STA, then AP aligns link transmissions using trigger parameters. Also, at end of aligned Link1 and Link2 transmissions, AP responds with BA on each link. Here, AP can change the TXOP owner on Link2, where AP may be encouraged to do this by a trigger request (e.g., immediate trigger to requester is not possible, so switching TXOP owner is a delayed response to the trigger request).

Figure 14:
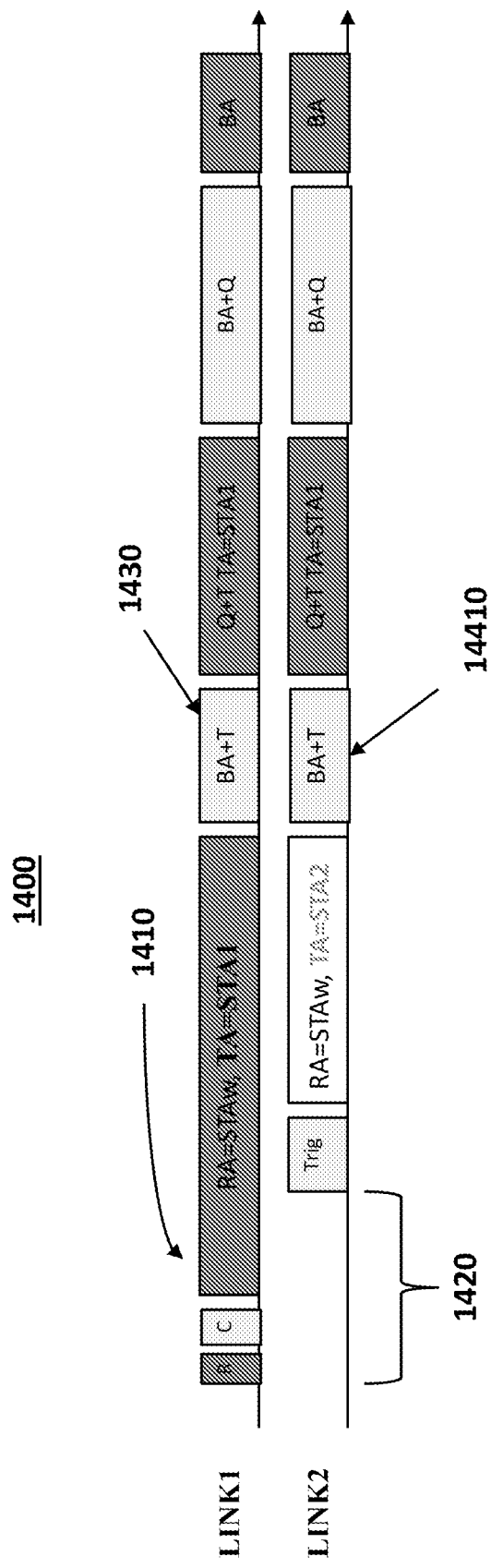
FIG. 14 is a schematic diagram illustrating a UTA TX TX triggered swap case, according to aspects of the disclosure.

FIG. 14 illustrates a UTA TX TX triggered swap case 1400. The dark grey areas indicate STA1 TX and all other areas indicate STA1 RX. Section 1410 indicates a frame exchange in a TXOP initiated by STA1, section 1420 indicates STAw EDCA, section 1430 indicates a BA transmission with RA=STA1, and T is a trigger included in the PPDU that contains the BA, with the trigger for STA1, and section 1440 indicates a BA transmission with RA=STA2, but the T representing an accompanying trigger within the PPDU that contains the BA is for STA1. For this UTA TX TX triggered swap case, STAw initially triggers STA2 on Link2 because trigger reception will fail on Link2 for STA1 because of the ongoing STA1 TX on Link1 causing interference at STA1 Link2. Here, STA1 resumes monitoring Link2 at the end of the Link1 TX, the STAw BA response on Link2 includes a trigger for STA1 (i.e., delayed response to an optional request for trigger), and STA1 is now transmitting synchronously on Link1 and Link2.

In aspects of the disclosure, TX TX priority access is provided. For example, medium access rules may allow a Link1 transmitter to initiate a transmission on Link2 when previously obtained NAV and PHY header LENGTH information on Link2 have expired before the end of the transmission on Link1 (i.e., Link2 NAV, CRS LENGTH are obtained before the start of the TX on Link1) and without regard to the backoff countdown. Here, the medium access rules may optionally permit the use of only Intra-BSS NAV (i.e., inter-BSS NAV is ignored) when making a decision to transmit on Link2 at the expiration of the Link2 NAV and LENGTH during a transmission on Link1. Also, when the last Link2 NAV, LENGTH expires, then 1) any fully active EDCA STAs competing on Link2 will be resuming their backoff (i.e., not initiating a TX) and 2) STA1 may access Link2 after LIFS with no backoff resumption. Because of this combination of conditions, there is no other competition for Link2 because everyone else has a non-zero backoff and there is only one TX TX priority access STA coming from Link1 (i.e., STA1) because there is only one winner on Link1. Optionally, the priority access is only allowed if the PPDU that is active on Link2 during the NAV of Link2 is indicated as having the same BSS color as the STA1 transmitting on Link1.

Figure 15:
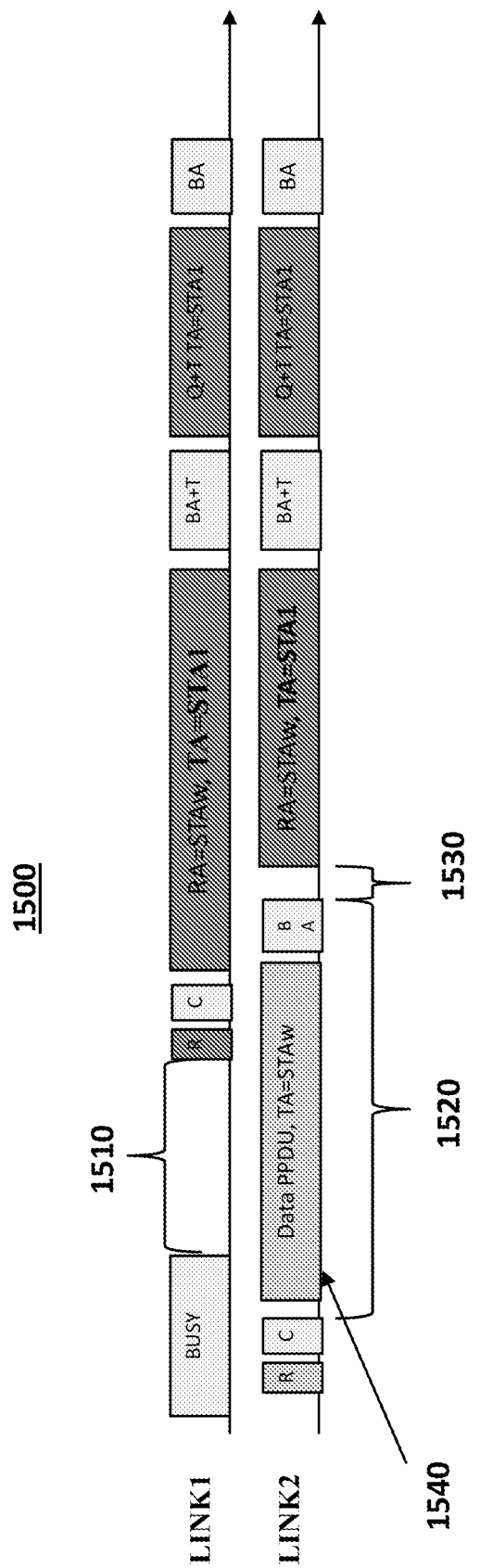
FIG. 15 is a schematic diagram illustrating a TX TX priority access case, according to aspects of the disclosure.

FIG. 15 illustrates a TX TX priority access case 1500. The dark grey areas indicate STA1 TX and all other areas indicate STA1 RX. Section 1510 indicates STA1 EDCA, section 1520 indicates STA1 NAV, section 1530 indicates STA1 LIFS, and section 1540 indicates STA1 BSS color observed (optional). LIFS has a link IFS (e.g., a delay of [SIFS,SIFS+2×SLOT]) without examining the medium. Here, Link2 RTS CTS is absent, where RTS CTS exchange is not possible because STA1 cannot RX a CTS on Link2. TX TX priority access may be optionally only allowed when the previous occupant PPDU on Link2 was an intra-BSS PPDU (e.g., STA1 BSS color match observed in PPDU(s) within the preceding Link2 exchange). The Link2 preceding exchange might be a longer sequence. For example, the BA might be followed by another Data PPDU (e.g., NAV value did not anticipate another transmission). Here, it may add a bit to PHY Header to indicate if another PPDU will follow (i.e., a bit that indicates that this PPDU is the next to last PPDU of a sequence, set this bit to "1" in the PHY header of the Data PPDU with TA=STAw). If the bit is present, then optionally, the priority access rules may only allow the priority access when the bit is found set to "1".

In aspects of the disclosure, an RX RX case with one recipient is provided. For a useful case, RX on Link1 does not interfere with RX on Link2, however, there are response transmissions elicited by the receptions which will create TX RX cases. For an easy case, 1) Asynchronous capable AP acquires Link1, initiates TX to STA1 and 2) during AP TX to STA1 on Link1, AP acquires Link2 (e.g., AP can cause TX PPDU on Link2 to align with Link1 TX to avoid bad overlaps). For a harder case, PPDU receptions at STA1 on Link1 and Link2 are from unrelated sources.

Figure 16:
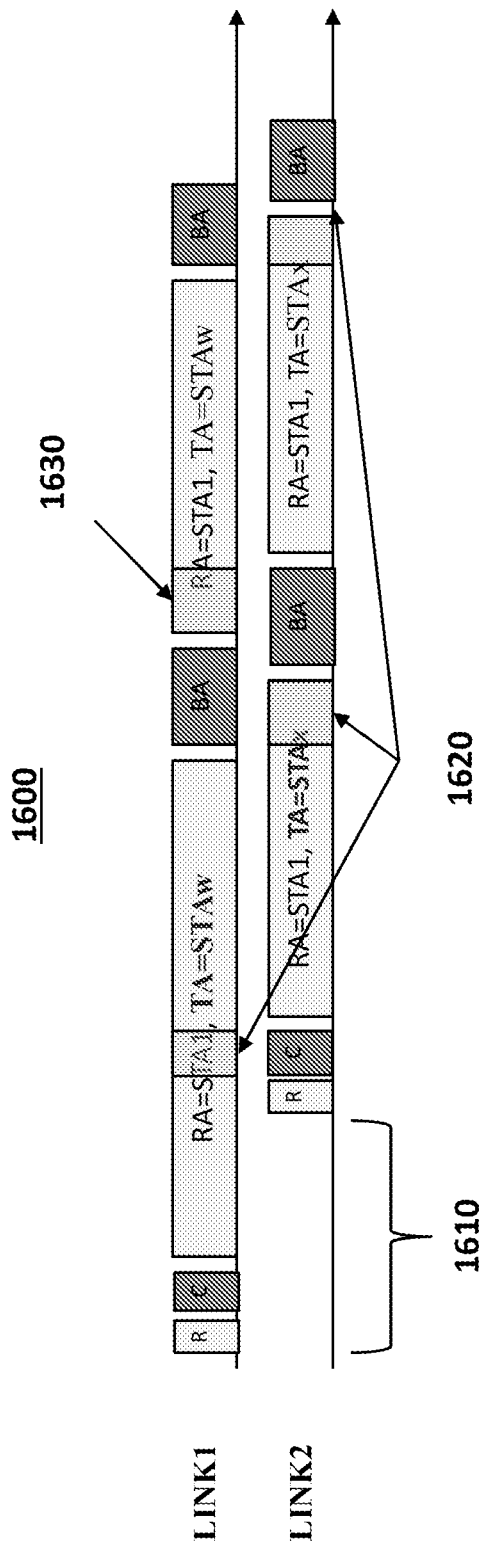
FIG. 16 is a schematic diagram illustrating an RX RX operation with one recipient case, according to aspects of the disclosure.

FIG. 16 illustrates an RX RX operation with a one-recipient case 1600. The dark grey areas indicate STA1 TX and all other areas indicate STA1 RX. Section 1610 indicates STAx EDCA, sections 1620 indicate potential loss of MPDUs, and section 1630 indicates potential loss of PHY header and all MPDUs contained within the entire PPDU to which the PHY header belongs. For this RX RX operation with one recipient case 1600, STA1 receives unaligned PPDUs on two links from unrelated transmitters. Also, some interference does greater damage than other interference (e.g., a lost PHY header means an entire PPDU is lost, interference occurring in the middle of a PPDU causes some bit errors, but if the PPDU contains an aggregate MPDU (AMPDU) then only those MPDUs of the AMPDU that had bit errors induced by the interference will fail due to the interference.). Aligned RX PPDU end times would prevent such loss.

Figure 17:
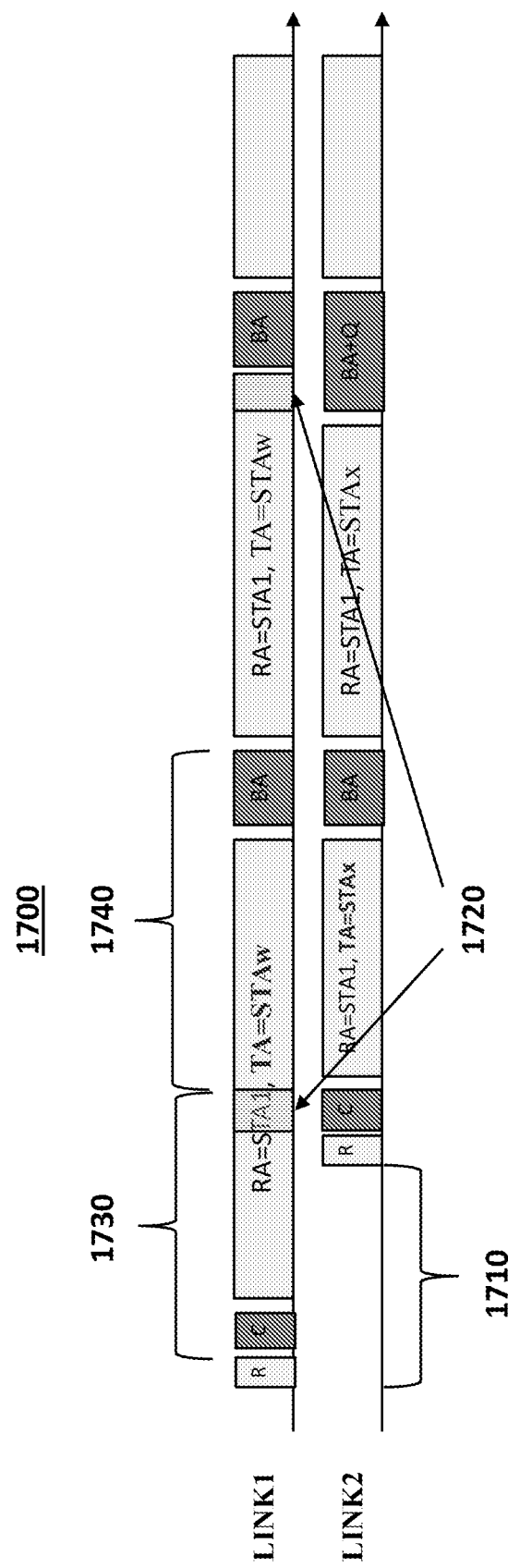
FIG. 17 is a schematic diagram illustrating an unrelated transmission alignment case, according to aspects of the disclosure.

FIG. 17 illustrates an unrelated transmission alignment case 1700. Section 1710 indicates STAx EDCA, sections 1720 indicate potential loss of MPDUs, section 1730 indicates a duration of 2000 and section 1740 indicates a duration of 3000. For this unrelated transmission alignment case 1700, Link2 RTS DUR==9500 and Link2 CTS DUR==3000 (e.g., negotiated DUR). Also, CTS indicates amount of time available for PPDU+BA to create aligned operation with the activity on Link1, where STAx obeys CTS DUR in its following PPDU transmission, rather than the initially indicated RTS DUR, thereby causing RX/TX alignment. In some aspects of the disclosure, STAx can read PHY LEN from Link1 TX (e.g., uses PHY LEN to create alignment). In addition, BA+Q is an AMPDU which contains a BA+quality of service (QoS) Data, where there are enough symbols to align the next transmissions in the sequence (e.g., forced TXOP sharing).

Figure 18:
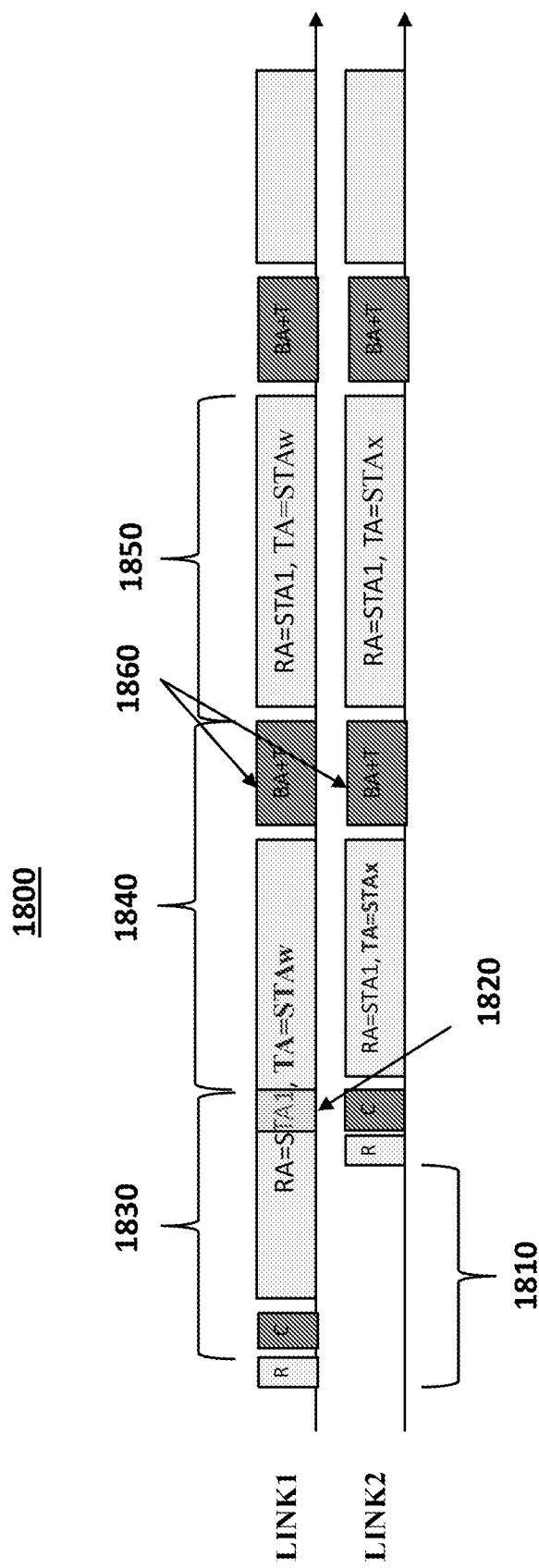
FIG. 18 is a schematic diagram illustrating a UTA RX RX with T case, according to aspects of the disclosure.

FIG. 18 illustrates a UTA RX RX with T case 1800. Section 1810 indicates STAx EDCA, sections 1820 indicate potential loss of MPDUs, section 1830 indicates a duration of 2000, section 1840 indicates a duration of 3000, section 1850 indicates T, and section 1860 indicates a same transmitter. For this UTA RX RX with T case 1800, the BA+T contains AMPDU BA information plus a trigger containing Time/DUR information, where Time/DUR information indicates the exact duration of the next PPDU that is requested by the trigger. Also included is other information similar to a trigger (e.g., TX power, Target RSSI, MCS, etc., as optionally desired), as well as a suggested BA duration (e.g., in this example, it is the same BA transmitter on both links, so they should be aligned). Also, the triggers (T) are present in the PPDUs containing the BA MPDUS only if there is a next PPDU, as the additional T information is intended to create alignment of subsequent PPDUs, whereas, if there are no subsequent PPDUs, then T is not needed.

In some aspects of the disclosure, BA responses might not originally be of the same length. Here, if the response transmissions are from the same transmitter, then the transmitter of the responses should ensure that the end times of the responses on the different links are aligned. This alignment may be accomplished in various ways, including modifying either or both frames through 1) adding or subtracting padding, 2) adding or subtracting frame delimiters, 3) modifying the MCS or other encoding to change the duration of the response by changing the bit rate of the frame, 4) adding information bytes into the response frame, 5) subtracting information bytes from the response frame, where preferably the shorter frame is lengthened. Thus, in general, all STA should always attempt to ensure that the end of any transmitted PPDU aligns with the end of any ongoing PPDU on the other link(s). This, may be applicable to other cases than the RX RX case.

In aspects of the disclosure, for RX RX cases, any STA monitoring Link1 and Link2 may be able to determine 1) RA of first PPDU on Link1 and 2) avoid the initiation of a TX on Link2 to the same RA or may line up Link2 TX PPDU end time with a PPDU end time on Link1. This is only possible if a Link2 transmitter can determine the RA of a Link1 RX PPDU, which is in the MAC header, where SINR, MCS might not allow this information to be correctly decoded. Thus, AID values may be used, which may be present within PHY Headers which require a lower SINR to be decoded correctly and where AID values with accompanying MAC address values should be delivered to all STA in the BSS, which requires lookup operation AID->MAC address. Also, a simple solution is to always line up any new TX with any ongoing TX to avoid such lookup operations.

In aspects of the disclosure, there are several RX RX rules. For example, any STA monitoring Link1 and Link2 should determine if Link1 transmitter STA1 is synchronous, such as by examining an indication in the PHY header of the Link1 PPDU that says "I am a Synchronous Mode STA" or by examining other information in MAC header (e.g., TA combined with capability information previously exchanged in other connection establishment and capability advertisement frames). If Link1 transmitter is synchronous, then any STA transmitting on Link2, should create an alignment with the PPDU on Link1, regardless of source and destination PPDU on Link1. This allows STA1 to remain in synch with EDCA channel condition on Link2 even while deaf on Link2 due to NEXT from Link1 TX. An example easier rule is all STA always align their TX end time with any existing "other link" TX PPDU end time, which means no need for "I am a Synchronous Mode STA" indication. This applies to all combinations of RX, TX. As another example, AP may set such a rule or recommendation for the BSS, or not (e.g., always align or not based on known membership of the BSS or just to be safe) and advertise the need for the rule or recommendation by transmitting an indication within beacons.

In aspects of the disclosure, for the RX RX response frame, the response frame to RX frames may not line up. For example, if the same recipient is generating parallel responses on >1 links, then the recipient should add symbols to the shorter response to make it the same length as the longer response to maintain alignment of PPDUs on both links. This is regardless of the sources of the eliciting frames and regardless of the multi-rate rules for response rate selection (i.e., the shortest resulting response frame should be increased in length to match the longer one, thereby making the shorter one an exception to the existing rules).

Figure 19:
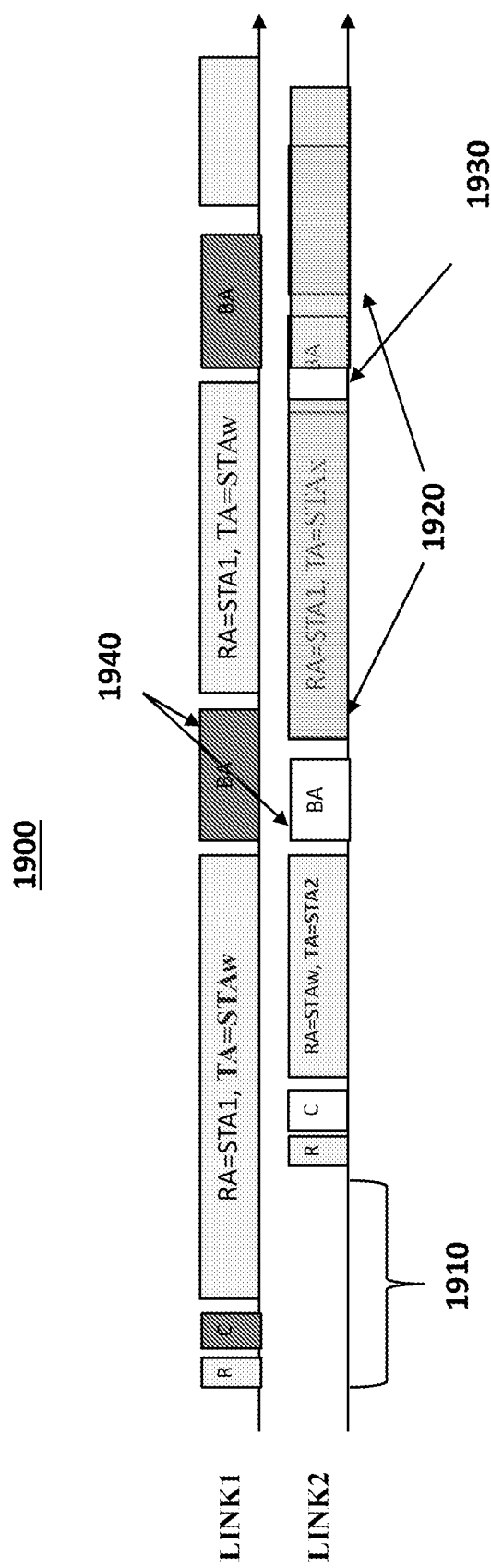
FIG. 19 is a schematic diagram illustrating an RX RX operation with two recipients case, according to aspects of the disclosure.

FIG. 19 illustrates an RX RX operation with two recipients case 1900. Section 1910 indicates STAw EDCA, sections 1920 indicate undesired loss of EDCA synch with Link2 medium condition at STA1, section 1930 indicates Link2 EDCA synch recovery at STA1, and sections 1940 indicate BA length difference due to MCS BS, etc., of different transmitters. For this RX RX operation with two recipients case 1900, there are two recipients from the same source (e.g., STAw is asynchronous, such as AP MLD). Here, transmitter STA2 should create alignment of transmissions, though this is sometimes not possible, in which case responses cause loss of alignment. MCS, BW, etc. differences between links can cause responses to be of different lengths, where the transmitter may provide triggers to elicit responses of identical length. If different recipients will generated responses, the transmitter that starts on the second link (e.g., Link2) should predict response length that will be on Link1, align end time of initial Link2 PPDU with Link1 PPDU, and insert a trigger into Link2 PPDU that will create a response on Link2 to match the response on Link1.

In aspects of the disclosure, an RX TX case is provided. For example, STA1 might want to attempt RX TX. STA1 can decide whether it wants to do this, but should follow some basic behavior to create alignment. For a related RX, when the RX is intended for STA1, less likely to want to start TX. For an unrelated RX, when the RX is intended for other than STA1, then start TX is normal operation, as EDCA continues on the other link, though alignment should still be practiced.

Figure 20:
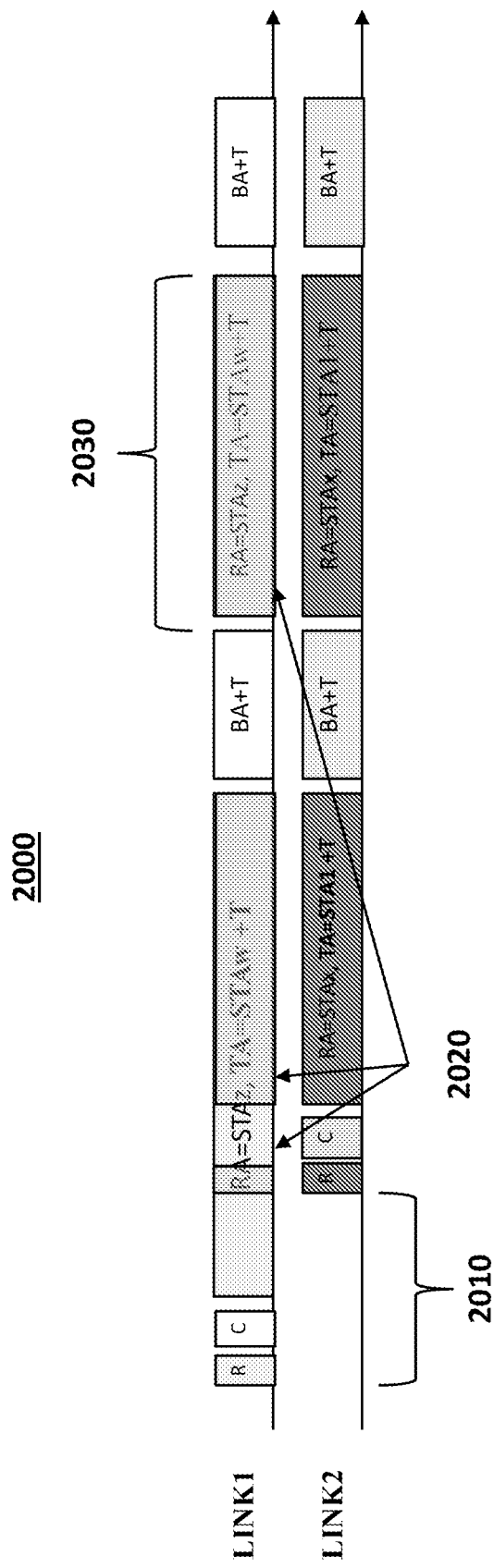
FIG. 20 is a schematic diagram illustrating a UTA RX TX unrelated case, according to aspects of the disclosure.

FIG. 20 illustrates a UTA RX TX unrelated case 2000. Section 2010 indicates EDCA, sections 2020 indicate unconcerned potential loss of MPDUs because the MPDUs are intended for reception by a different STA, and section 2030 indicates T. For this UTA RX TX unrelated case 2000, STA1 is receiving a PPDU on Link1, RA< >STA1, where STA1 EDCA continues on Link2. Also, STA1 is the next TXOP winner on Link2. In addition, STA1 aligns Link2 PPDUs with Link1 PPDUs. Here, STA1 determines expected Link1 BA response length, STA1 includes suggested BA length information T to continue alignment to include alignment of the PPDUs containing the BAs, STA1 reads BA T information from Link1 to determine next PPDU length, and when UL==1, then STA1 knows that this alignment works.

The UTA RX TX unrelated case 2000 may use response time fields to create alignment (i.e., provide "T" information as shown in FIG. 20). It may also use AMPDU aggregation to fill response to appropriate lengths (i.e., include "Q" data as shown in FIG. 20). It may also add an uplink indication bit in PHY header (e.g., UL bit), where it assumes that color is present and if AP advertises asynchronous behavior and UL==1, then a STA can transmit a frame on another link to the AP (e.g., may be able to transmit to another STA, if it can tell which STA is transmitting, thus including AID in PHY header would help to determine this).

Figure 21:
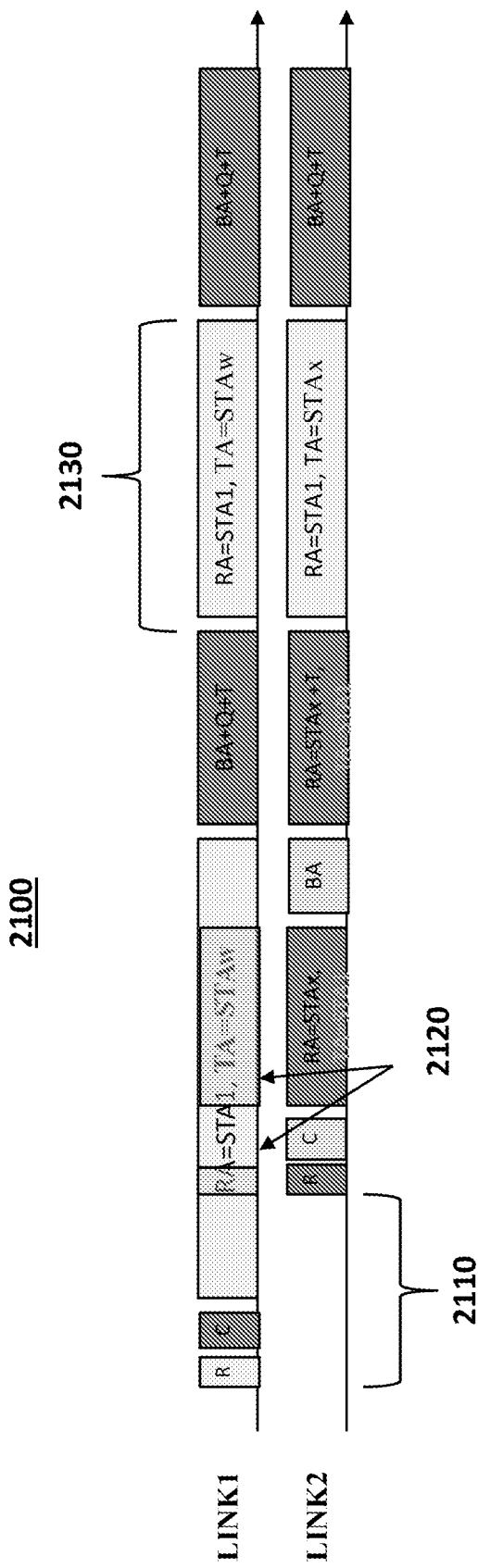
FIG. 21 is a schematic diagram illustrating a UTA RX TX related case, according to aspects of the disclosure.

FIG. 21 illustrates a UTA RX TX related case 2100. Section 2110 indicates EDCA, sections 2120 indicate potential loss of MPDUs, and section 2130 indicates T. For this UTA RX TX related case 2100, STA1 is receiving a PPDU on Link1, RA==STA1. Also, STA1 is the next TXOP winner on Link2, coincident with ongoing Link1 RX at STA1 to STA1. In addition, STA1 adjusts TX power and MCS of Link2 TX to reduce impact on Link1 RX. Here, TX power and MCS may be adjusted to different values in later, aligned PPDUs (i.e., increased TX power, increased MCS).

The UTA RX TX related case 2100 may use response time fields to create alignment (i.e., provide "T" information as shown in FIG. 21). It may also use AMPDU aggregation to fill response to appropriate lengths (i.e., include "Q" data as shown in FIG. 21). It may also add an uplink indication bit in PHY header (e.g., UL bit), where it assumes that color is present and if AP advertises asynchronous behavior and UL==1, then a STA can transmit a frame on another link to the AP (e.g., may be able to transmit to another STA, if it can tell which STA is transmitting, thus including AID in PHY header would help to determine this).

In aspects of the disclosure, a TX RX case is provided. Here, STA1 cannot control possible initiation of TX RX case, though STA1 may attempt to control alignment.

Figure 22:
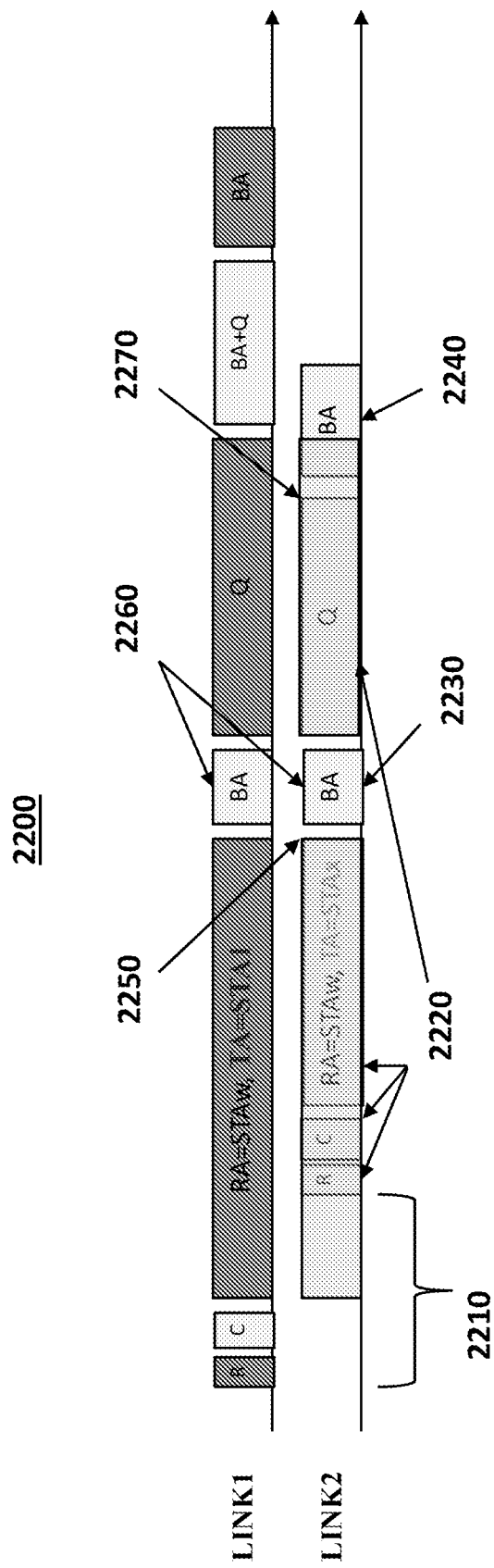
FIG. 22 is a schematic diagram illustrating a UTA TX RX unrelated case, according to aspects of the disclosure.

FIG. 22 illustrates a UTA TX RX unrelated case 2200. Section 2210 indicates STAx EDCA, sections 2220 indicate potential loss of MPDUs by STA1, section 2230 indicates STA1 Link2 EDCA medium state is correct, section 2240 indicates STA1 Link2 EDCA medium state is not correct, section 2250 indicates STAx aligns Link2 PPDU with Link1 PPDU, sections 2260 indicate the same transmitter for both links, and section 2270 indicates STAx Link2 PPDU not aligned with Link1 PPDU. For this UTA TX RX unrelated case 2200, STA1 is the first TXOP winner and begins TX on Link1, where RX begins on Link2 during Link1 TX. Also, STAx continues EDCA on Link2, reaches Backoff==0, where STAx should align PPDUs and uses PHY header from Link1 transmission. In addition, BA responses are from the same transmitter, therefore these can be aligned as STAw recognizes the need.

Figure 23:
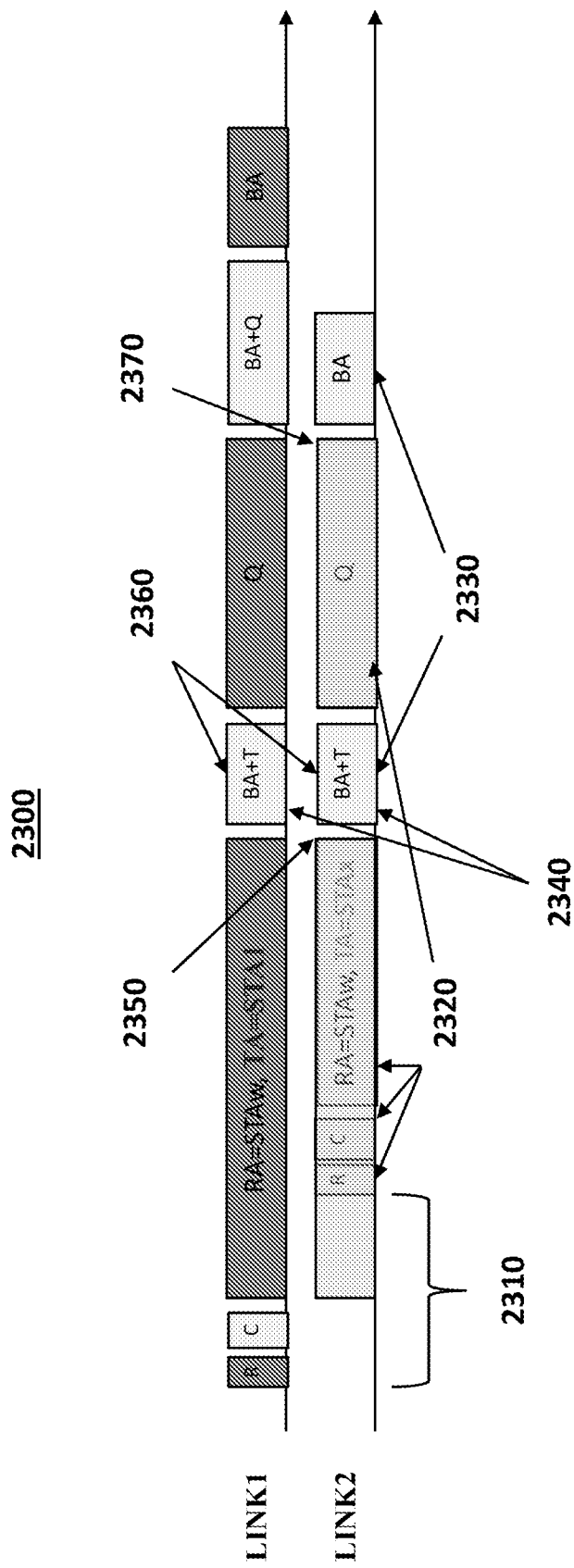
FIG. 23 is a schematic diagram illustrating another UTA TX RX unrelated case, according to aspects of the disclosure.

FIG. 23 illustrates another UTA TX RX unrelated case 2300. Section 2310 indicates STAx EDCA, sections 2320 indicate potential loss of MPDUs by STA1, sections 2330 indicate STA1 Link2 EDCA medium state is correct, section 2340 indicates STA2 combines trigger with BA to continue the alignment, section 2350 indicates STAx aligns Link2 PPDU with Link1 PPDU, sections 2360 indicate the same transmitter for both links, and section 2370 indicates STAx Link2 PPDU is aligned with Link1 PPDU. For this UTA TX RX unrelated case 2300, STAw combines BA with Trigger to force alignment of next PPDU on both links. Here, STA1 and STAx include buffer status and/or trigger request information to assist in the generation of triggers to be included with the BA by STAw.

In aspects of the disclosure, UTA TX RX unrelated case 2300 can happen when Link1 activity detail is not visible to transmitter on Link2 (e.g., STAx is a single link STA). If STAx is tuned to Link1 and can decode TA of Link1 TX, and STAx knows that STA1 is synchronous only (e.g., TDLS STA should know capability), then STAx should not TX to STA1 on Link2. However, STAx might not be able to decode TA of Link1 TX (i.e., TX RX case is possible), thus may add STA ID within PHY header (e.g., add AID information to TDLS setup).

Figure 24:
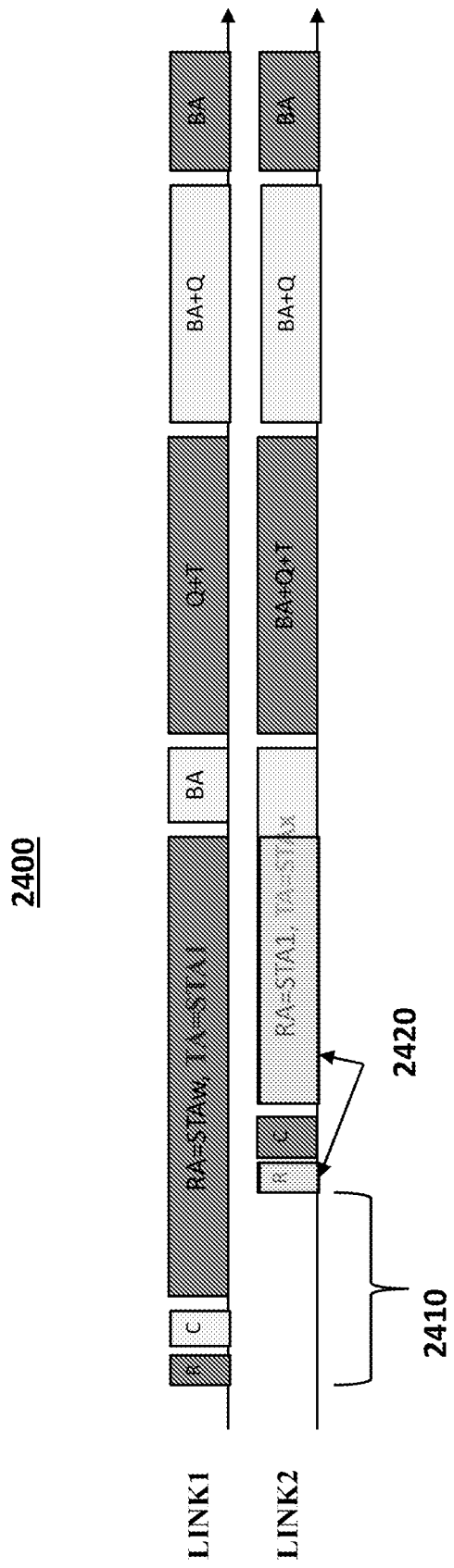
FIG. 24 is a schematic diagram illustrating a UTA TX RX related case, according to aspects of the disclosure.

FIG. 24 illustrates a UTA TX RX related case 2400. Section 2410 indicates STAx EDCA and sections 2420 indicate potential loss of MPDUs. For this UTA TX RX related case 2400, STA1 is the first TXOP winner and begins TX on Link1, where RX begins on Link2 during Link1 TX. Also, STAx examines RTS on Link2, where if RTS is from an EHT STA then STA1 can send CTS or CTA that dictates PPDU parameters to allow RX TX (e.g., MCS, PPDU DUR, end of Link1 TX). If RTS is from a non-EHT STA, then STA1 can choose to not respond to the RTS.

In aspects of the disclosure, UTA TX RX related case 2400 can happen when Link1 activity detail is not visible to transmitter on Link2 (e.g., STAx is a single link STA). If STAx is tuned to Link1 and can decode TA of Link1 TX, and STAx knows that STA1 is synchronous only (e.g., TDLS STA should know capability), then STAx should not TX to STA1 on Link2. However, STAx might not be able to decode TA of Link1 TX (i.e., TX RX case is possible), thus may add STA ID within PHY header (e.g., add AID information to TDLS setup).

In aspects of the disclosure, CTA may be used as an additional mechanism. For a non-EHT RTS transmitter, use existing CTS with non-EHT RTS transmitter, where it cannot affect non-EHT PPDU alignment with CTS. For an EHT RTS transmitter, EHT STA sends RTS using RA==MAC MLD address (ADDR) and RA value identifies RTS transmitter as EHT. This allows EHT RTS recipient to respond with either of CTS with DUR for PPDU limitation or CTA frame with more specific, explicit information (e.g., PPDU Duration, MCS, TX power, etc., BA duration).

Figure 25:
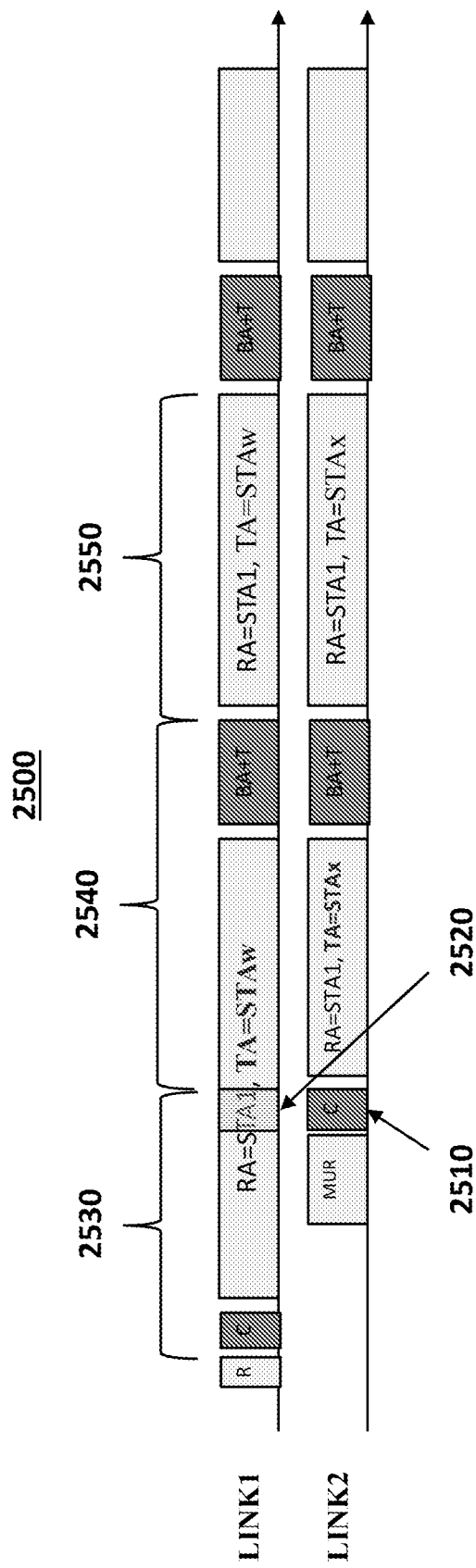
FIG. 25 is a schematic diagram illustrating a UTA with T MU DL using CTA case, according to aspects of the disclosure.

FIG. 25 illustrates a UTA with T MU DL using CTA case 2500. Section 2510 indicates MU CTS CTA for STA1, sections 2520 indicate potential loss of MPDUs, section 2530 indicates a duration of 2000, section 2540 indicates a duration of 3000, and section 2550 indicates T. For this UTA with T MU DL using CTA case 2500, there is an MU RTS/MU CTS exchange. Here, the MU CTS response is modified to allow CTA instead of NON HT CTS (e.g., for the one user that is currently active on Link1). Also, the MU RTS transmitter adjusts DL orthogonal frequency-division multiple access (OFDMA) PPDU per CTA response. Provided that only one exchange is occurring on Link1, there is only one CTA response to the MU RTS to N users, thereby allowing the MU RTS transmitter to meet the requirements for DL OFDMA PPDU DUR value from only one user while the remainder of MU RTS responders are still sending NON HT CTS.

In aspects of the disclosure, mechanisms for resolving conflict are provided. For example, STA1 tries to force alignment by STAx, where STAx might have its own TX/RX issues and might want to force alignment by STA1. Here, the first frame transmitted in time determines priority. To resolve this issue, no request translates to a requirement and each STA receiving instructions can decide on its own to obey or not.

In aspects of the disclosure, proposed behaviors are provided. For example, non-AP STA indicates mode with parameters may include synchronous mode for a given link channel combination, NEXT level at Link2 while transmitting on Link1, and TX power indication (e.g., list of powers per MCS, current TX power setting allowing non-AP STA to adjust level to allow ED required check for triggered TX operation). As another example, AP uses non-AP STA parameters to determine if and when which DL TX during UL TX is okay, determine if and when Trigger to STA during UL TX is okay, and line up TX end times to same STA on different links when they have different start times. As yet another example, allow non-AP STA to send trigger (e.g., addressed to a single STA).

A further example is to require a STA to line up end time of any TX on a link when other link has already started. Here, there is no need to check AID or MAC address or anything of ongoing PPDU, a limit to intra-BSS (e.g., AP indicates alignment required in BSS), and a limit to PPDU of a Sync TX STA (e.g., signal "I'm a synch TX STA" in the PHY header). Yet another example is additional link request signaling, which includes adding signaling bits to request additional links, which allows respondent to add to response transmission to align PPDUs. Another example is next frame signaling, which allows respondent to dictate next frame duration to force alignment.

In aspects of the disclosure, BSS behavior indication is provided. Here, AP is allowed to dictate that all associated STAs that are capable of aligning transmissions align their transmissions. This is provided by adding a signaling bit that can be transmitted within beacons and other management frames, and by requiring that receiving STAs that understand the operational rule obey the rule (i.e., align transmissions on one link with transmissions on another link). May only apply the requirement to intra-BSS PPDUs.

Figure 26:
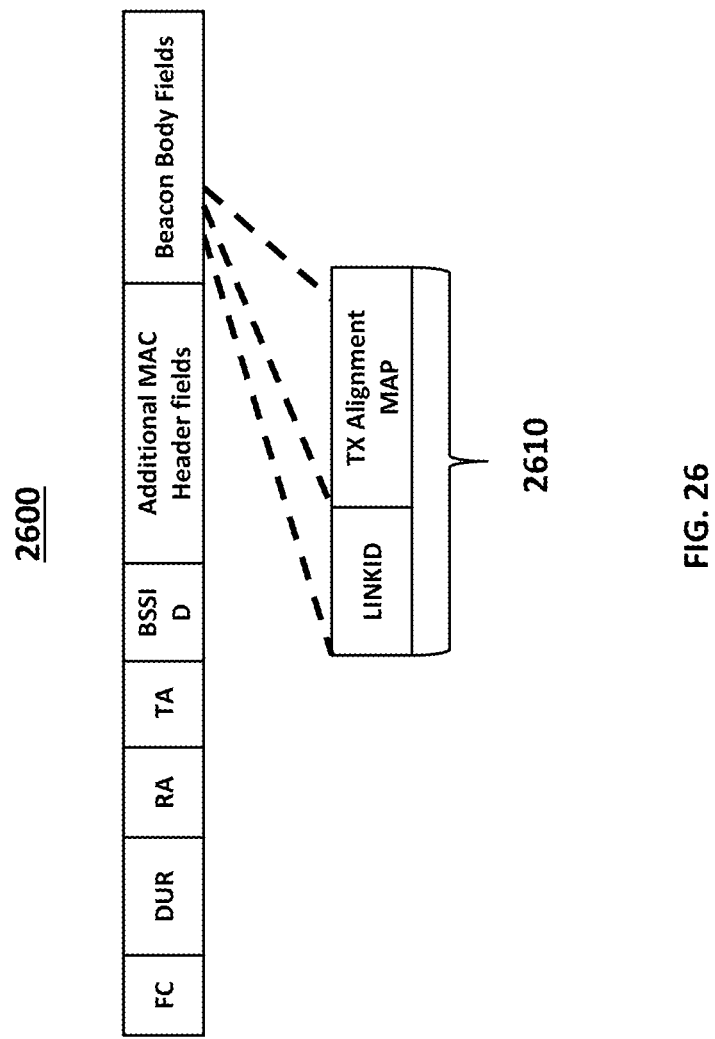
FIG. 26 is a schematic diagram illustrating an AP requiring aligned transmission case, according to aspects of the disclosure.

FIG. 26 illustrates an AP requiring aligned transmission case 2600. Section 2610 indicates repeating for each link that AP is capable of supporting. For this AP requiring aligned transmission case 2600, a beacon transmitted by AP includes an indication of the requirement for alignment of transmissions on various links (e.g., Link1, Link2 transmissions should be aligned). Here, information includes a LINKID plus a map to indicate which links must be aligned to the link with this LINKID (e.g., bits set to "1" in a bitmap indicate that those links should have aligned PPDUs) and the map is arranged in LINKID order.

In aspects of the disclosure, a synchronous STA indication PHY is provided. Here, add 1 bit to the PHY header, synchronous transmitter (SYT) STA to indicate that the transmitting STA is a synchronous STA. If a STA receives a PPDU with SYT==1, the listening receivers should align any transmission on an affected link with the end time with the end time of the transmission of this PPDU on this link, provided that they share the same BSS COLOR (i.e., not overlapping basic service set (OBSS)). It is not necessary to align to OBSS, but may be preferable. Also, may add active link bits to the PHY header to indicate which other links the Synch STA has enabled (i.e., on which other links PPDU end times should be aligned to the PPDU on this link).

Figure 27:
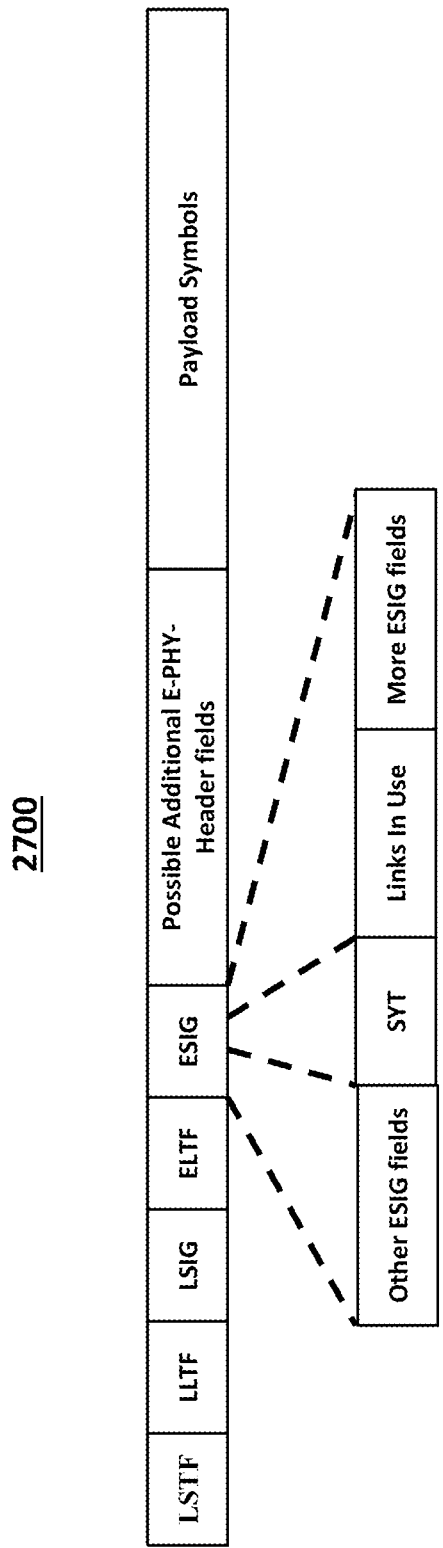
FIG. 27 is a schematic diagram illustrating an SYT indication in PHY header case, according to aspects of the disclosure.

FIG. 27 illustrates an SYT indication in PHY header case 2700. For SYT=synchronous transmitter STA, where SYT==1 is transmitting STA indicates that it is a synchronous mode STA, and SYT==0 is transmitting STA indicates that it is not a synchronous mode STA. Also, other EHT signal (ESIG) and more ESIG fields contain further information (e.g., MCS, Length, AID, encoding, BSS Color, etc.). In addition, ESIG may also include indication of which other links are in use by the transmitter of this PPDU (e.g., links in use subfield, a bitmap of the links arranged in ascending frequency (FREQ) order, 1==in use, 0==not in use).

In aspects of the disclosure, a synchronous STA indication MAC is provided. Here, add 1 bit to the MAC header and or frame to indicate that the transmitting STA is a synchronous STA. If a STA receives a PPDU with SYT==1, the listening receivers should align any transmission on an affected link with the end time with the end time of the transmission of this PPDU on this link, provided that they share the same BSS COLOR (i.e., not OBSS). It is not necessary to align to OBSS, but may be preferable. Also, may add active link bits to the MAC header and/or frame to indicate which other links the Synch STA has enabled (i.e., on which other links PPDU end times should be aligned to the PPDU on this link).

Figure 28:
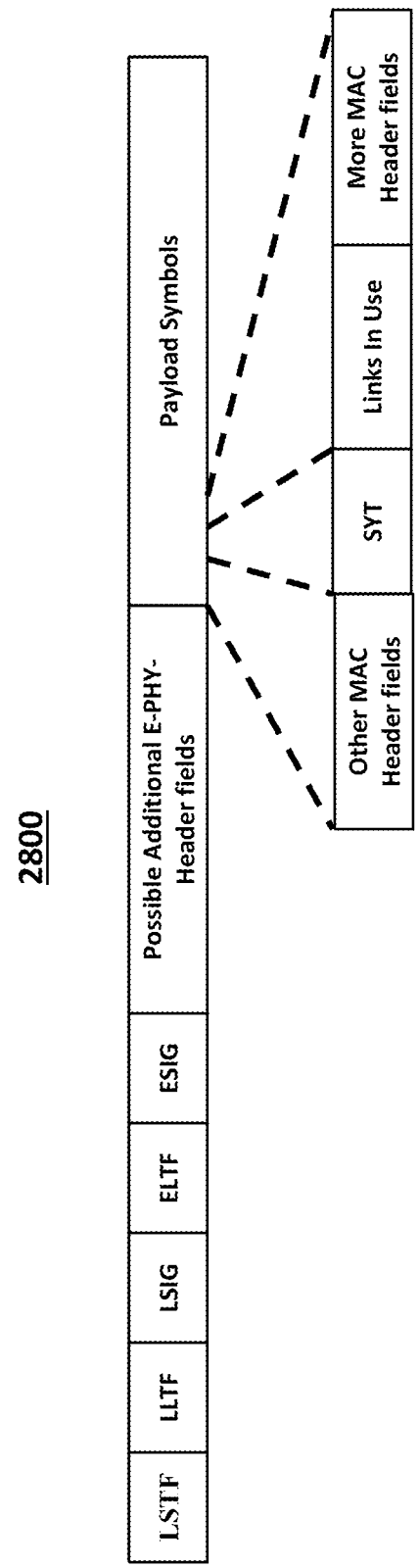
FIG. 28 is a schematic diagram illustrating an SYT indication in MAC header case, according to aspects of the disclosure.

FIG. 28 illustrates an SYT indication in MAC header case 2800. For SYT=synchronous transmitter STA, where SYT==1 is transmitting STA indicates that it is a synchronous mode STA, and SYT==0 is transmitting STA indicates that it is not a synchronous mode STA. Also, other ESIG and more ESIG fields contain further information (e.g., MCS, Length, AID, encoding, BSS Color, etc.). In addition, ESIG may also include indication of which other links are in use by the transmitter of this PPDU (e.g., links in use subfield, a bitmap of the links arranged in ascending FREQ order, 1==in use, 0==not in use). A STA that has a link enabled, but is currently in an inactive state (e.g., a DOZE power save state) should set the bit corresponding to the inactive state link to "0" to indicate that the link is not currently in use.

In aspects of the disclosure, TX rules are provided. For example, a STA that receives from its AP an indication that TX alignment should be performed for Link with LINKID X with respect to LINKID Y as indicated by the presence of a "1" in the LINK Y location of the bitmap for LINKID X (e.g., align any TX PPDU on Link X with any ongoing PPDU on Link Y). As another example, a STA that receives an RX PPDU with a PHY header indication that the transmitter of the PPDU is a synchronous transmitter (SYT==1), should align any TX PPDU with the ongoing RX PPDU if the TX PPDU will be transmitted on an affected link, as indicated in the "links in use" field of the PHY header of the RX PPDU. Also, the rules may have an additional condition which is that BSS Color of the RX PPDU must match the BSS color of the TX STA.

In aspects of the disclosure, other changes are provided. For example, for forced TXOP sharing (e.g., all STA), it may be required that BA recipient accept BA+QoS Data instead of only BA (e.g., BA+QoS Data extends BA PPDU duration to force alignment of start of next RX PPDUs). Also, for CTS negotiated DUR (e.g., EHT STA), it may be required that CTS recipient adjust PPDU duration per received CTS DUR value. Additionally, for dictated RX PPDU duration (e.g., EHT STA), BA+T forces alignment of end of next RX PPDUs by forcing duration of next RX PPDUs (e.g., T field is new information only understood by new STAs).

In aspects of the disclosure, triggering request conditions are provided. For example, add two bits to MPDU may mean request a specific link to be triggered (e.g., a bitmap of link identifications (LINKIDs), where a "1" means trigger me in a corresponding link). As another example, add two bits to MPDU may mean request a specific AC or higher to be triggered. In yet another example, may allow non-AP STA to trigger another STA, where it is per request, limit to N==1, and response is SU PPDU instead of HE TB PPDU.

Figure 29:
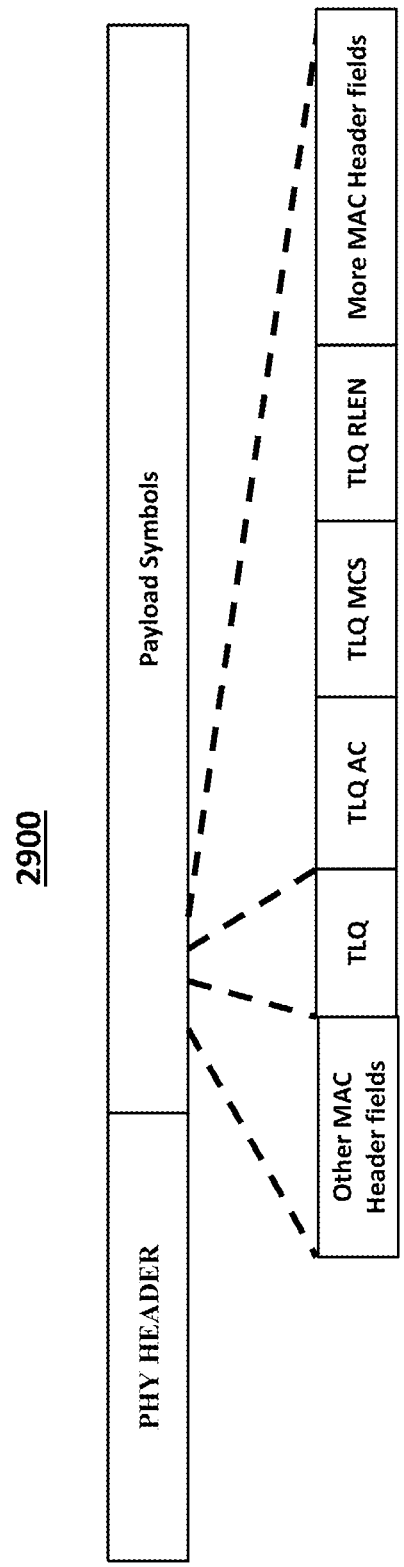
FIG. 29 is a schematic diagram illustrating trigger request case, according to aspects of the disclosure.

FIG. 29 illustrates trigger request case 2900. For TLQ=trigger link request, a bitmap of links is arranged in LINKID order, a "1" in the bitmap corresponding to a LINKID indicates a request for a trigger on the link corresponding to that LINKID, and a "0" in the bitmap corresponding to a LINKID indicates a request to NOT be triggered on the link corresponding to that LINKID. Here TLQ AC is a requested preferred AC value for the trigger frame, TLQ MCS is a recommended MCS for the trigger PPDU, and TLQ RLEN is the length of the response to the trigger, optional, as the recipient of the trigger should line up the triggered response.

In aspects of the disclosure, triggering request options are provided. For example, the trigger request could be an MPDU (i.e., a complete frame with PHY Header, MAC header, trigger fields as described earlier, plus optionally the AID of STA requesting the trigger and a synchronous mode parameter (SMP), which is 1) a value indicating the noise floor at the trigger request transmitting STA on the link on which the trigger is requested, and 2) SMP could be specified per link, as the trigger request bitmap TLQ could include more than one trigger request for more than one link). Optionally, AID information would need to be made available to all STA within a BSS by the AP. A trigger request may be incorporated into an existing frame, using for example A-control.

In aspects of the disclosure, a modified trigger frame and response are provided. For example, modify the trigger frame or TRS to allow a single user to be triggered to send a non-TB frame (e.g., any SU PPDU) versus the existing response to the trigger being an HE TB PPDU (i.e., an explicit indication to the trigger recipient to respond with an SU PPDU instead of an HE TB PPDU). Here, the modification may just be based on the TA of the trigger frame (i.e., if TA of trigger frame < >BSS identification (BSSID), then this is a trigger for an SU PPDU, not an HE TB PPDU).

In aspects of the disclosure, trigger and TRS modifications are provided. For example, any STA is allowed to transmit a trigger/TRS (i.e., not only an AP is allowed to transmit a trigger) either in response to an RTS, or as an initial PPDU of a TXOP. As another example, the trigger/TRS should include parameters that cause the triggered PPDU to align with the other link PPDU. In yet another example, the trigger/TRS is modified to include a field to indicate that the response to the Trigger is an SU PPDU (e.g., instead of an HE TB PPDU). As another example, the trigger/TRS may trigger more than one user to respond, in which case, the response would be HE TB PPDU, not SU PPDU. In another example, the trigger/TRS is modified to allow the trigger recipient to choose some of the parameters of the trigger response PPDU (e.g., MCS, RSSI Target, Spatial Reuse) (e.g., CS not required because RTS was used to solicit the trigger, so medium IDLE condition is already satisfied). However, the PPDU duration must be present and must be used by the trigger recipient in order to align the PPDU with the PPDU on other link(s).

In aspects of the disclosure, next frame duration mechanisms are provided. For example, add signaling in the MAC portion of the frame to indicate next frame duration in order to maintain alignment. This can be included in any PPDU (e.g., containing BA, containing QoS data, and including a bitmap of the Link1Ds for which the information applies). The information may be included in a separate, new MPDU built for this purpose, or may be contained in a field within an existing frame, such as in the A-control field. A receiving STA should use this information for its next PPDU transmission on an affected link as identified in the bitmap (e.g., regardless of the destination of the PPDU). As another example, the next frame duration may be in the form of a trigger with modified format, for example, to allow for an SU PPDU response to the trigger, and to allow trigger recipient to choose MCS, including a bitmap of the Link1Ds for which the information applies. Here, a receiving STA should use this information for its next PPDU transmission on an affected link as identified in the bitmap regardless of the destination of the PPDU.

In aspects of the disclosure, QoS data may be included in the responses. For example, allow BA response to be increased in length to meet alignment requirements by adding QoS Data or other information to add payload symbols, and require receiving STA to accept the combination instead of only a BA response.

In aspects of the disclosure, TX AID may be added to PHY header. For example, TX AID plus "This transmitter is synchronous", where together this is a request to other STA to avoid transmitting to the STA corresponding to TX AID to avoid a TX/RX combination that would fail RX, and accompanied by exchanging AID information between TDLS peers. This applies to RX/TX and TX/RX.

In aspects of the disclosure, RTS CTS exchange mechanisms are provided. For example, STA receiving CTS in response to RTS, where if CTS DUR value is less than expected according to the standard rule of RTS DUR—SIFS—CTS_duration, then RTS transmitter restricts duration of PPDU following CTS to the duration specified in the CTS or RTS transmitter restricts duration of PPDU following CTS plus expected BA PPDU to the duration specified in the CTS. As another example, STA receiving CTA in response to RTS uses information provided in CTA to determine next PPDU transmission parameters and to set the next-next PPDU duration parameter in the next PPDU.

In aspects of the disclosure, CTS zero mechanisms are provided. For example, CTS response may contain DUR==0 to indicate that no transmission should follow (i.e., a refusal of the RTS, or RTS recipient is not ready to receive data PPDUs at the current time). If a CTS with DUR==0 is received, then the RTS transmitter knows that there was no collision failure, there was no BER failure, and RTS transmitter is not required to modify CW as it would have in the case of a failure to receive a CTS. Also, RTS transmitter should send a CF-END to cancel the NAV, or could use the reserved time to transmit to another STA.

In aspects of the disclosure, RTS TA or RA value mechanisms are provided. For example, an RTS TA value can be set to RTS transmitter's MILD ADDR value to indicate that RTS transmitter understands CTA frame, where CTA can be transmitted in response to the RTS when the MLD ADDR is present in the TA field of the RTS. As another example, an RTS TA value can be set to RTS recipient's MLD ADDR value to indicate that RTS transmitter understands CTA frame, where CTA can be transmitted in response to the RTS when the MLD ADDR is present in the RA field of the RTS.

In aspects of the disclosure, all discussions herein assume that the number of involved links may be greater than 2. For example, alignment might be required to be performed for transmissions on 3 or 4 or more links, rather than only on 2 links.

Figure 30:
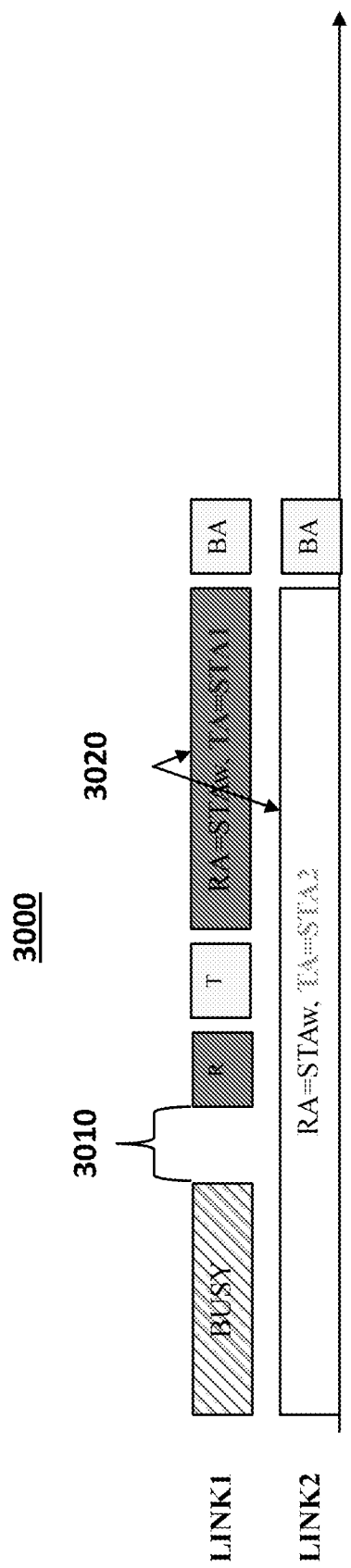
FIG. 30 is a schematic diagram illustrating another TX TX RTS trigger case, according to aspects of the disclosure.

In aspects of the disclosure, a TX TX RTS trigger case 3000 is provided, as shown in FIG. 30. Section 3010 indicates STA1 EDCA counts down to 0 and section 3020 indicates data PPDUs. Here, MLD AP has declared Link2 as triggered only, which is optional, where some STA2 is using Link2. STAw forces alignment of STA1 TX by sending a trigger in response to RTS (i.e., no opportunity for dual-trigger multi-link UL TX by STA1). This helps NSTR STA1 recover from deafness during LINK1 TX operation, where there is no need to modify any deafness recovery protocol, but forcing the alignment makes that protocol work better because the formerly deaf STA is likely to get it right, i.e., what STA1 believes to be IDLE is actually IDLE. Also, STAw should make both BA the same length.

Figure 31:
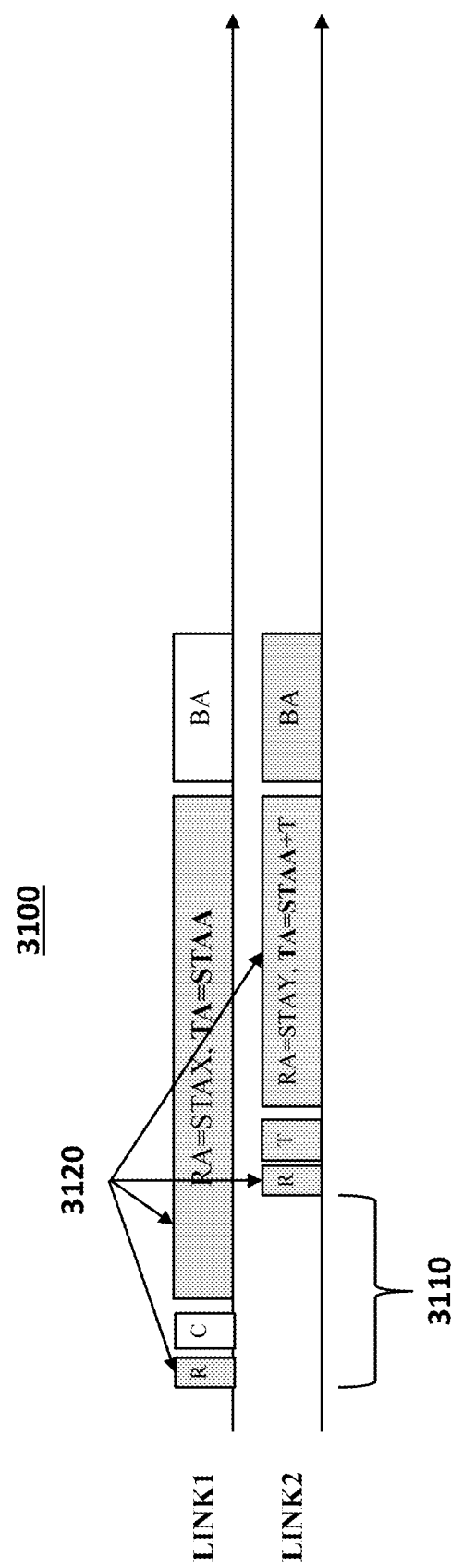
FIG. 31 is a schematic diagram illustrating a non-AP STA trigger sequence, according to aspects of the disclosure.

In aspects of the disclosure, a non-AP STA trigger sequence 3100 is provided, as shown in FIG. 31. Section 3110 indicates EDCA and sections 3120 indicate AP TX. Here, a trigger response to RTS includes Link1 (e.g., AP DL TX to STAX) and Link2 (e.g., AP DL TX to STAY). Also, STAY responds to AP RTS with trigger to align DL TX (e.g., AP does not have cross-link information). In addition, STAA should attempt to align BA, where STAA can include trigger in data PPDU for non-cross link AP.

Figure 32:
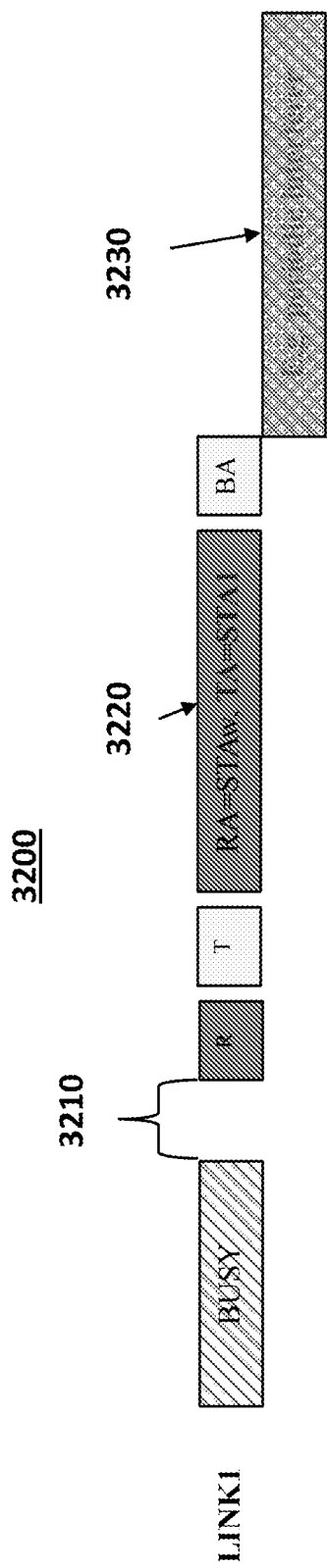
FIG. 32 is a schematic diagram illustrating an expected interference trigger case, according to aspects of the disclosure.

In aspects of the disclosure, an expected interference trigger case 3200 is provided, as shown in FIG. 32. Section 3210 indicates STA1 EDCA counts down to 0, section 3220 indicates data PPDUs, and section 3230 indicates recipient expected future internal/local interference event. Here, STAw knows about upcoming local/internal interference/resource issue (e.g., a period of time with antenna sharing with other communications technology, a period of time which is sensitive regarding other communications technology, channel switching for scheduled P2P exchange or other scheduled absence event). Also, trigger requests DATA phase is to operate within the constraints of the upcoming interference/commitment. This is not limited to MLD and it may be useful for single-link devices. For some scenarios, the BA transmission may occur during the local event. Also, the trigger may specify separate RX versus TX completion deadlines and subsequent interference end time.

In aspects of the disclosure, additional uses for triggered SU PPDU are provided. For example, for polling-like UL triggering (e.g., AP gains access and loans the TXOP to a selected STA). Here, various parameters of the UL TX may be left as choices for the triggered STA (e.g., length, MCS, number of spatial streams (NSS), etc.). As another example, for use in P2P exchanges (e.g., when the AP gains a TXOP and loans it to a STA for P2P use, when one peer has intermittent availability, the trigger is effectively a notification of the availability. Again, various parameters of the UL TX may be left as choices for the triggered STA (e.g., length, MCS, NSS, etc.).

In aspects of the disclosure, in some instances the STA transmitting the trigger may specify some strict parameters and some parameters whose exact values are left as choices for the triggered STA or within a range of values.

In aspects of the disclosure, triggered only link restrictions are provided. For example, the probability of being able to transmit a trigger on more than one link is enhanced if the AP has declared LinkB as triggered-only (e.g., AP does not have to deal with MyBSS competition). Limitations of a triggered-only link are 1) it reduces ability of any STA to gain lowest latency UL access (i.e., non-AP STA does not gain a latency advantage of having multiple links on which to compete for access when it is not allowed to compete for more than one link) and 2) latency performance can be regained if non-AP STAs are allowed to compete on the triggered link when it is not being used, as seen in the following trigger-limited link definition. Trigger-limited link includes triggered-only limitation only applies until one link is occupied, where when only one link is occupied, then triggered limitation is relaxed to allow EDCA access of the unoccupied, trigger-limited link. This is provided that the winner of a TXOP on the trigger-limited link performs alignment with the occupied link. Here, EDCA access is delayed until it is known whether both links will be triggered (e.g., EDCA access on trigger-limited link begins P interframe space (PIFS) after the start of the triggered PPDU on the occupied link, which is at the time that a trigger-aligned PPDU would have appeared, but has not appeared).

In aspects of the disclosure, comparison to a wait slot is provided. For a wait slot, 1) synchronous (aka NSTR) STA optionally holds a backoff count of a link at or near zero to wait for another link's backoff to reach zero, 2) simultaneous, aligned PPDU transmission on multiple links is achieved, 3) indicates that as loads increase, the probability of acquiring more than one link rapidly reduces, and 4) without alignment, as load increases, winning NSTR transmitters are effectively punished after each transmission, awaiting re-alignment on deaf channel (e.g., losing latency benefit of having multiple channels). Here, the RTS-trigger method with trigger-limited access rule allows multi-link access to be acquired under higher load conditions, where enforcement of PPDU alignment makes operation more efficient for small competing node counts (e.g., restores latency benefit). Also, centralized decision on number of links occupied by an NSTR competitor allows centralized decision regarding tradeoff between throughput and latency.

In aspects of the disclosure, the following rules may be included in the description of medium access 1) there shall be a trigger message that may be transmitted by an AP or a non-AP STA and that elicits SU PPDUs, 2) there shall be a frame exchange sequence that allows a trigger-like frame transmission in response to the receipt of an RTS, and 3) an AP may indicate a link to be trigger-limited such that UL access on the link is limited to triggered access, except that i) if a PPDU is transmitted on a non-trigger-limited link, then EDCA access may proceed on the trigger-limited link aRX-PHYDelay+PIFS after the start of a PPDU on the non-trigger-limited link, when that PPDU has a PHY LENGTH indication >=0.50 ms, and ii) any PPDU transmitted by a non-AP STA on the trigger-limited link shall terminate at or before the end of the aligned PPDU on the other link.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general-purpose or special-purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG and Millipede memory.

Further, the computer-readable storage medium can include any non-semiconductor memory, such as optical disk storage, magnetic disk storage, magnetic tape, other magnetic storage devices, or any other medium capable of storing one or more instructions. In some implementations, the tangible computer-readable storage medium can be directly coupled to a computing device while, in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence and organization of instructions can vary significantly without varying the underlying logic, function, processing and output.

While the above discussion primarily refers to microprocessor or multicore processors that execute software, one or more implementations are performed by one or more integrated circuits, such as application-specific integrated circuits (ASICs) or field-programmable gate arrays (FPGAs). In one or more implementations, such integrated circuits execute instructions that are stored on the circuit itself.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

The predicate words "configured to," "operable to," and "programmed to" do not imply any particular tangible or intangible modification of a subject, but rather are intended to be used interchangeably. For example, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations or one or more configurations. A phrase such as "an aspect" may refer to one or more aspects and vice versa. A phrase such as "a configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "example" is used herein to mean "serving as an example or illustration." Any aspect or design described herein as "an example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the terms "include," "have," or the like are used in the description or the claims, such terms are intended to be inclusive in a manner similar to the term "comprise," as "comprise" is interpreted when employed as a transitional word in a claim.

Those of skill in the art would appreciate that the various illustrative blocks, modules, elements, components, methods and algorithms described herein may be implemented as electronic hardware, computer software, or combinations of both. To illustrate this interchangeability of hardware and software, various illustrative blocks, modules, elements, components, methods and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way), all without departing from the scope of the subject technology.

What is claimed is:

1. A system comprising:
a multi-link device configured to transmit and receive communications on a plurality of links, the multi-link device configured to:
initiate transmission of a first data unit on a first link of the plurality of links;
transmit a frame to a second device, the frame comprising a request for the second device to transmit a trigger;
receive, responsive to the request by the device, the trigger from the second device, on at least one of the first link or at least another link of the plurality of links, wherein the trigger includes a duration field that indicates a time value to use for alignment of the transmission of the first data unit on the first link and a second transmission of a second data unit on the at least another link transmitted subsequent to a clear to send (CTS) with one or more physical layer protocol data units being received on the another link; and
responsive to the trigger from the second device requested by the device, align an end of a last symbol of the transmission of the first data unit on the first link with an end of a last symbol of the second transmission of the second data unit on the at least another link.

2. The system of claim 1, wherein the plurality of links are wireless links.

3. The system of claim 1, wherein the trigger causes a response of a single user physical layer protocol data unit.

4. The system of claim 1, wherein the trigger causes a response of a trigger-based physical layer protocol data unit.

5. The system of claim 1, wherein the frame comprises a request for a trigger frame.

6. The system of claim 1, wherein aligning the end of the last symbol of the transmission on the first data unit on the first link with the end of the last symbol of the second transmission of the second data unit on the at least another link comprises one of adding or subtracting bytes.

7. A system comprising:
a multi-link device configured to transmit and receive communications over a plurality of links, the multi-link device configured to:
receive a request-to-send (RTS) frame from a second device, the RTS frame setting a value of a received address (RA) to a multi-link device (MLA) address of the device;
determine from the value of the RA that the second device is capable of receiving a trigger, responsive to the RTS frame, instead of a clear-to-send (CTS) message;
determine to respond to the RTS frame with the trigger instead of the CTS message; and
transmit the trigger in response to the RTS frame instead of the CTS message.

8. The system of claim 7, wherein the MLD address is a machine-access-control (MAC) address.

9. The system of claim 7, wherein the device is configured to determine, based at least on the value of the RA, to respond to the RTS frame with the trigger instead of a channel time allocation (CTA) message.

10. The system of claim 7, wherein the value of the RA being set to the MLD address indicates that the second device is capable of receiving the trigger in response to the RTS frame.

11. The system of claim 7, wherein the trigger is modified to include a field to indicate that a response to the trigger is a single-user (SU) physical layer protocol data unit (PPDU).

12. The system of claim 7, wherein the trigger is modified to include a field to indicate that a response to the trigger is a multi-user (MU) physical layer protocol data unit (PPDU).

13. The system of claim 7, wherein the trigger comprises one or more parameters that causes a physical layer protocol data unit (PPDU) of the trigger to align with a PPDU on another link.

14. The system of claim 7, wherein the trigger is modified to specify that a recipient is allowed to choose one or more parameters of the trigger response physical layer protocol data unit (PPDU).

15. A system comprising:
a multi-link device configured to transmit and receive communications over a plurality of links, the multi-link device configured to:
transmit a request-to-send (RTS) frame to a second device;
receive a channel time allocation (CTA) message in response to the RTS frame, the CTA message including a duration field and information on one or more parameters of a following frame, wherein the duration field indicates a time value that will result in alignment of physical layer protocol data units (PPDUs) transmitted subsequent to a clear to send (CTS) with PPDUs being received on another link;
allow the CTA message in response to the RTS frame instead of a CTS; and
transmit, based on the duration field, a physical layer protocol data unit (PPDU).

16. The system of claim 15, wherein the one or more parameters comprises a parameter that is found in a trigger frame.

17. The system of claim 15, wherein the one or more parameters comprises one or more of the following: PPDU duration, modulating coding scheme (MCS) and transmit (TX) power.

18. The system of claim 15, wherein the device is further configured to transmit the PPDU with at least a portion of information found in a trigger.

19. The system of claim 15, wherein the device is further configured to transmit the PPDU with a trigger that triggers a response that corresponds to a response duration from the CTA message.

20. The system of claim 15, wherein the duration field is a duration field as in a clear-to-send (CTS) message.

* * * * *